(12) United States Patent
Rhoads et al.

(10) Patent No.: US 8,312,168 B2
(45) Date of Patent: *Nov. 13, 2012

(54) METHODS FOR LINKING FROM OBJECTS TO REMOTE RESOURCES

(75) Inventors: Geoffrey B. Rhoads, West Linn (AE); William C. Hein, III, Glenmoore, PA (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/867,480

(22) Filed: Oct. 4, 2007

(65) Prior Publication Data

US 2008/0140714 A1    Jun. 12, 2008

Related U.S. Application Data

(63) Continuation of application No. 09/531,076, filed on Mar. 18, 2000, now Pat. No. 8,180,844.

(51) Int. Cl.
*G06F 15/16* (2006.01)

(52) U.S. Cl. ........ 709/245; 709/218; 709/217; 709/219; 709/223; 709/227; 709/238; 709/242; 370/474; 370/475; 370/454

(58) Field of Classification Search .................. None
See application file for complete search history.

(56) References Cited

U.S. PATENT DOCUMENTS

| | | | |
|---|---|---|---|
| 4,499,601 A | 2/1985 | Matthews | |
| 4,528,588 A | 7/1985 | Lofberg | |
| 5,119,507 A | 6/1992 | Mankovitz | |
| 5,436,653 A | 7/1995 | Ellis et al. | |
| 5,481,294 A | 1/1996 | Thomas et al. | |
| 5,502,576 A | 3/1996 | Ramsay et al. | |
| 5,577,266 A | 11/1996 | Takahisa et al. | |
| 5,579,124 A | 11/1996 | Aijala et al. | |
| 5,581,800 A | 12/1996 | Fardeau et al. | |

(Continued)

FOREIGN PATENT DOCUMENTS

WO    WO9743736    11/1997

(Continued)

OTHER PUBLICATIONS

Macq, et al., "Cryptology for Digital TV Broadcasting," Proc of the IEEE, vol. 83, No. 6, Jun. 1995.

(Continued)

*Primary Examiner* — Syed A. Zia

(57) ABSTRACT

Technology is disclosed for associating content objects (e.g., paper documents, audio and video files, etc.) with corresponding information and/or action. One arrangement employs an architecture comprising a registration server, a router, and one or more product handlers. Identifiers for the content objects can be obtained in various ways, including decoding a digital watermark, deriving an identifier by hashing music data, sensing machine-readable data such as RFID or barcode data, etc. One particular method involves applying an algorithmic process to produce music- or video-content-identifying data; wirelessly sending the content-identifying data from the device in one or more packets including XML compliant data; and, as a consequence, receiving data back. By reference to this data, the receiving device presents information to a user that identifies a title of the content, and a performer of the content. Also presented are one or more features selectable by the user to obtain further information relating to the content, or different content. The technology is suitable for use with handheld devices, including cell phones and media players.

36 Claims, 10 Drawing Sheets

U.S. PATENT DOCUMENTS

| | | | |
|---|---|---|---|
| 5,584,050 A | 12/1996 | Lyons | |
| 5,606,609 A | 2/1997 | Houser et al. | |
| 5,613,004 A | 3/1997 | Cooperman et al. | |
| 5,640,193 A | 6/1997 | Wellner | |
| 5,687,236 A | 11/1997 | Moskowitz et al. | |
| 5,710,834 A | 1/1998 | Rhoads | |
| 5,721,919 A * | 2/1998 | Morel et al. | 1/1 |
| 5,740,244 A | 4/1998 | Indeck et al. | |
| 5,745,604 A | 4/1998 | Rhoads | |
| 5,748,763 A | 5/1998 | Rhoads | |
| 5,761,606 A | 6/1998 | Wolzien | |
| 5,765,152 A | 6/1998 | Erickson | |
| 5,768,426 A | 6/1998 | Rhoads | |
| 5,774,452 A | 6/1998 | Wolosewicz | |
| 5,781,914 A | 7/1998 | Stork | |
| 5,790,172 A | 8/1998 | Imanaka | |
| 5,822,432 A | 10/1998 | Moskowitz et al. | |
| 5,822,436 A | 10/1998 | Rhoads | |
| 5,838,790 A | 11/1998 | McAuliffe et al. | |
| 5,841,978 A | 11/1998 | Rhoads | |
| 5,848,413 A | 12/1998 | Wolff | |
| 5,850,481 A | 12/1998 | Rhoads | |
| 5,862,260 A | 1/1999 | Rhoads | |
| 5,870,552 A | 2/1999 | Dozier | |
| 5,899,700 A * | 5/1999 | Williams et al. | 434/308 |
| 5,903,892 A | 5/1999 | Hoffert | |
| 5,923,327 A | 7/1999 | Smith | |
| 5,956,048 A * | 9/1999 | Gaston | 345/530 |
| 5,963,957 A | 10/1999 | Hoffberg | |
| 5,969,283 A | 10/1999 | Looney | |
| 5,986,690 A | 11/1999 | Hendricks | |
| 5,988,897 A | 11/1999 | Pierce et al. | |
| 6,014,569 A | 1/2000 | Bottum | |
| 6,026,193 A | 2/2000 | Rhoads | |
| 6,061,719 A * | 5/2000 | Bendinelli et al. | 709/218 |
| 6,076,734 A | 6/2000 | Dougherty et al. | |
| 6,081,830 A | 6/2000 | Schindler | |
| 6,098,106 A | 8/2000 | Philyaw | |
| 6,121,530 A | 9/2000 | Sonoda | |
| 6,122,392 A | 9/2000 | Rhoads | |
| 6,122,403 A | 9/2000 | Rhoads | |
| 6,141,010 A * | 10/2000 | Hoyle | 715/854 |
| 6,148,407 A | 11/2000 | Aucsmith | |
| 6,151,624 A | 11/2000 | Teare | |
| 6,169,541 B1 | 1/2001 | Smith | |
| 6,185,318 B1 | 2/2001 | Jain et al. | |
| 6,188,010 B1 | 2/2001 | Iwamura | |
| 6,199,048 B1 | 3/2001 | Hudetz et al. | |
| 6,201,176 B1 | 3/2001 | Yourlo | |
| 6,205,249 B1 | 3/2001 | Moskowitz | |
| 6,219,793 B1 | 4/2001 | Li et al. | |
| 6,222,807 B1 | 4/2001 | Min-Jae | |
| 6,226,672 B1 | 5/2001 | DeMartin et al. | |
| 6,229,924 B1 | 5/2001 | Rhoads et al. | |
| 6,230,212 B1 * | 5/2001 | Morel et al. | 719/316 |
| 6,233,684 B1 | 5/2001 | Stefik | |
| 6,243,480 B1 | 6/2001 | Zhao et al. | |
| 6,249,226 B1 | 6/2001 | Harrison et al. | |
| 6,266,430 B1 | 7/2001 | Rhoads | |
| 6,285,776 B1 | 9/2001 | Rhoads | |
| 6,286,036 B1 | 9/2001 | Rhoads | |
| 6,289,108 B1 | 9/2001 | Rhoads | |
| 6,307,949 B1 | 10/2001 | Rhoads | |
| 6,311,214 B1 * | 10/2001 | Rhoads | 709/217 |
| 6,324,573 B1 | 11/2001 | Rhoads | |
| 6,330,335 B1 | 12/2001 | Rhoads | |
| 6,343,138 B1 | 1/2002 | Rhoads | |
| 6,345,104 B1 | 2/2002 | Rhoads | |
| 6,353,672 B1 | 3/2002 | Rhoads | |
| 6,363,159 B1 | 3/2002 | Rhoads | |
| 6,374,036 B1 | 4/2002 | Ryan et al. | |
| 6,377,986 B1 * | 4/2002 | Philyaw et al. | 709/219 |
| 6,381,341 B1 | 4/2002 | Rhoads | |
| 6,385,329 B1 | 5/2002 | Sharma et al. | |
| 6,389,055 B1 | 5/2002 | August | |
| 6,389,151 B1 | 5/2002 | Carr et al. | |
| 6,400,827 B1 | 6/2002 | Rhoads | |
| 6,404,898 B1 | 6/2002 | Rhoads | |
| 6,408,082 B1 | 6/2002 | Rhoads et al. | |
| 6,408,331 B1 | 6/2002 | Rhoads | |
| 6,411,725 B1 | 6/2002 | Rhoads | |
| 6,421,070 B1 | 7/2002 | Ramos et al. | |
| 6,424,725 B1 | 7/2002 | Rhoads et al. | |
| 6,425,081 B1 | 7/2002 | Iwamura | |
| 6,430,302 B2 | 8/2002 | Rhoads | |
| 6,442,285 B2 | 8/2002 | Rhoads et al. | |
| 6,449,377 B1 | 9/2002 | Rhoads | |
| 6,449,379 B1 | 9/2002 | Rhoads | |
| 6,460,036 B1 * | 10/2002 | Herz | 707/748 |
| 6,496,591 B1 | 12/2002 | Rhoads | |
| 6,505,160 B1 | 1/2003 | Levy et al. | |
| 6,505,191 B1 * | 1/2003 | Baclawski | 1/1 |
| 6,516,079 B1 | 2/2003 | Rhoads et al. | |
| 6,519,352 B2 | 2/2003 | Rhoads | |
| 6,522,769 B1 | 2/2003 | Rhoads et al. | |
| 6,522,770 B1 | 2/2003 | Seder et al. | |
| 6,522,771 B2 | 2/2003 | Rhoads | |
| 6,535,617 B1 | 3/2003 | Hannigan et al. | |
| 6,535,618 B1 | 3/2003 | Rhoads | |
| 6,539,095 B1 | 3/2003 | Rhoads | |
| 6,542,618 B1 | 4/2003 | Rhoads | |
| 6,542,620 B1 | 4/2003 | Rhoads | |
| 6,542,927 B2 | 4/2003 | Rhoads | |
| 6,549,922 B1 | 4/2003 | Srivastava | |
| 6,549,933 B1 | 4/2003 | Barrett | |
| 6,553,129 B1 | 4/2003 | Rhoads | |
| 6,560,349 B1 | 5/2003 | Rhoads | |
| 6,560,350 B2 | 5/2003 | Rhoads | |
| 6,567,533 B1 | 5/2003 | Rhoads | |
| 6,567,534 B1 | 5/2003 | Rhoads | |
| 6,567,535 B2 | 5/2003 | Rhoads | |
| 6,567,780 B2 | 5/2003 | Rhoads | |
| 6,574,350 B1 | 6/2003 | Rhoads et al. | |
| 6,580,808 B2 | 6/2003 | Rhoads | |
| 6,580,819 B1 | 6/2003 | Rhoads | |
| 6,587,821 B1 | 7/2003 | Rhoads | |
| 6,590,996 B1 | 7/2003 | Reed et al. | |
| 6,590,997 B2 | 7/2003 | Rhoads | |
| 6,590,998 B2 | 7/2003 | Rhoads | |
| 6,597,377 B1 * | 7/2003 | MacPhail | 715/738 |
| 6,605,160 B2 | 8/2003 | Hoskin | |
| 6,611,607 B1 | 8/2003 | Davis et al. | |
| 6,614,914 B1 | 9/2003 | Rhoads et al. | |
| 6,628,928 B1 | 9/2003 | Crosby | |
| 6,647,128 B1 | 11/2003 | Rhoads | |
| 6,647,129 B2 | 11/2003 | Rhoads | |
| 6,647,130 B2 | 11/2003 | Rhoads | |
| 6,650,761 B1 * | 11/2003 | Rodriguez et al. | 382/100 |
| 6,654,480 B2 | 11/2003 | Rhoads | |
| 6,654,887 B2 | 11/2003 | Rhoads | |
| 6,671,424 B1 * | 12/2003 | Skoll et al. | 382/305 |
| 6,674,993 B1 | 1/2004 | Tarbouriech | |
| 6,675,146 B2 | 1/2004 | Rhoads | |
| 6,681,028 B2 * | 1/2004 | Rodriguez et al. | 382/100 |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,724,912 B1 | 4/2004 | Carr et al. | |
| 6,728,726 B1 * | 4/2004 | Bernstein et al. | 1/1 |
| 6,735,311 B1 | 5/2004 | Rump et al. | |
| 6,735,324 B1 | 5/2004 | McKinley et al. | |
| 6,738,495 B2 | 5/2004 | Rhoads et al. | |
| 6,744,907 B2 | 6/2004 | Rhoads | |
| 6,750,985 B2 | 6/2004 | Rhoads | |
| 6,754,377 B2 | 6/2004 | Rhoads | |
| 6,757,406 B2 | 6/2004 | Rhoads | |
| 6,760,463 B2 | 7/2004 | Rhoads | |
| 6,763,123 B2 | 7/2004 | Reed et al. | |
| 6,766,363 B1 | 7/2004 | Rothschild | |
| 6,768,808 B2 | 7/2004 | Rhoads | |
| 6,768,809 B2 | 7/2004 | Rhoads et al. | |

| | | | |
|---|---|---|---|
| 6,771,796 B2 | 8/2004 | Rhoads | |
| 6,775,392 B1 | 8/2004 | Rhoads | |
| 6,778,682 B2 | 8/2004 | Rhoads | |
| 6,798,894 B2 | 9/2004 | Rhoads | |
| 6,804,376 B2 | 10/2004 | Rhoads et al. | |
| 6,804,379 B2 | 10/2004 | Rhoads | |
| 6,807,570 B1 * | 10/2004 | Allen et al. | 709/219 |
| 6,813,366 B1 | 11/2004 | Rhoads | |
| 6,829,368 B2 | 12/2004 | Meyer et al. | |
| 6,834,308 B1 | 12/2004 | Ikezoye et al. | |
| 6,850,626 B2 | 2/2005 | Rhoads et al. | |
| 6,856,977 B1 | 2/2005 | Adelsbach | |
| 6,879,701 B1 | 4/2005 | Rhoads | |
| 6,882,738 B2 | 4/2005 | Davis et al. | |
| 6,917,724 B2 | 7/2005 | Seder et al. | |
| 6,920,232 B2 | 7/2005 | Rhoads | |
| 6,931,451 B1 | 8/2005 | Logan et al. | |
| 6,931,588 B1 * | 8/2005 | Nakano | 715/207 |
| 6,941,275 B1 | 9/2005 | Swierczek | |
| 6,941,338 B1 * | 9/2005 | Madsen | 709/203 |
| 6,944,298 B1 | 9/2005 | Rhoads | |
| 6,947,571 B1 | 9/2005 | Rhoads et al. | |
| 6,959,100 B2 | 10/2005 | Rhoads | |
| 6,959,386 B2 | 10/2005 | Rhoads | |
| 6,965,682 B1 | 11/2005 | Davis et al. | |
| 6,965,683 B2 * | 11/2005 | Hein, III | 382/100 |
| 6,965,873 B1 | 11/2005 | Rhoads | |
| 6,970,573 B2 | 11/2005 | Carr et al. | |
| 6,975,746 B2 | 12/2005 | Davis et al. | |
| 6,978,036 B2 | 12/2005 | Alattar et al. | |
| 6,983,051 B1 | 1/2006 | Rhoads | |
| 6,987,862 B2 | 1/2006 | Rhoads | |
| 6,988,202 B1 | 1/2006 | Rhoads et al. | |
| 6,993,152 B2 | 1/2006 | Patterson et al. | |
| 6,996,252 B2 | 2/2006 | Reed et al. | |
| 7,003,132 B2 | 2/2006 | Rhoads | |
| 7,003,731 B1 | 2/2006 | Rhoads et al. | |
| 7,006,661 B2 | 2/2006 | Miller et al. | |
| 7,010,263 B1 | 3/2006 | Patsiokas | |
| 7,024,016 B2 | 4/2006 | Rhoads et al. | |
| 7,027,614 B2 | 4/2006 | Reed | |
| 7,035,427 B2 | 4/2006 | Rhoads | |
| 7,044,395 B1 * | 5/2006 | Davis et al. | 235/494 |
| 7,050,603 B2 | 5/2006 | McKinley et al. | |
| 7,051,086 B2 | 5/2006 | Rhoads et al. | |
| 7,054,462 B2 | 5/2006 | Rhoads et al. | |
| 7,054,463 B2 | 5/2006 | Rhoads et al. | |
| 7,054,465 B2 | 5/2006 | Rhoads | |
| 7,058,223 B2 | 6/2006 | Cox | |
| 7,058,697 B2 | 6/2006 | Rhoads | |
| 7,062,069 B2 | 6/2006 | Rhoads | |
| 7,065,559 B1 * | 6/2006 | Weiss | 709/219 |
| 7,076,084 B2 | 7/2006 | Davis et al. | |
| 7,095,871 B2 | 8/2006 | Jones et al. | |
| 7,111,168 B2 * | 9/2006 | Lofgren et al. | 713/176 |
| 7,111,170 B2 | 9/2006 | Rhoads et al. | |
| 7,113,614 B2 | 9/2006 | Rhoads | |
| 7,113,615 B2 | 9/2006 | Rhoads et al. | |
| 7,130,087 B2 | 10/2006 | Rhoads | |
| 7,139,408 B2 | 11/2006 | Rhoads et al. | |
| 7,158,654 B2 | 1/2007 | Rhoads | |
| 7,164,780 B2 | 1/2007 | Brundage et al. | |
| 7,171,016 B1 | 1/2007 | Rhoads | |
| 7,171,018 B2 * | 1/2007 | Rhoads et al. | 382/100 |
| 7,174,031 B2 | 2/2007 | Rhoads et al. | |
| 7,174,293 B2 | 2/2007 | Kenyon et al. | |
| 7,177,443 B2 | 2/2007 | Rhoads | |
| 7,181,022 B2 | 2/2007 | Rhoads | |
| 7,184,570 B2 | 2/2007 | Rhoads | |
| 7,185,201 B2 | 2/2007 | Rhoads et al. | |
| 7,206,820 B1 | 4/2007 | Rhoads et al. | |
| 7,209,573 B2 * | 4/2007 | Evans et al. | 382/100 |
| 7,213,757 B2 | 5/2007 | Jones et al. | |
| 7,224,819 B2 | 5/2007 | Levy et al. | |
| 7,239,734 B2 | 7/2007 | Alattar et al. | |
| 7,242,790 B2 | 7/2007 | Rhoads | |
| 7,248,717 B2 | 7/2007 | Rhoads | |
| 7,251,475 B2 | 7/2007 | Kawamoto | |
| 7,261,612 B1 | 8/2007 | Hannigan et al. | |
| 7,263,203 B2 | 8/2007 | Rhoads et al. | |
| 7,266,217 B2 | 9/2007 | Rhoads et al. | |
| 7,269,275 B2 | 9/2007 | Carr et al. | |
| 7,286,684 B2 | 10/2007 | Rhoads et al. | |
| 7,302,574 B2 | 11/2007 | Conwell et al. | |
| 7,305,104 B2 | 12/2007 | Carr et al. | |
| 7,305,117 B2 | 12/2007 | Davis et al. | |
| 7,308,110 B2 | 12/2007 | Rhoads | |
| 7,313,251 B2 | 12/2007 | Rhoads | |
| 7,313,253 B2 | 12/2007 | Davis et al. | |
| 7,316,347 B2 * | 1/2008 | Poor | 235/375 |
| 7,319,775 B2 | 1/2008 | Sharma et al. | |
| 7,321,667 B2 | 1/2008 | Stach | |
| 7,330,564 B2 | 2/2008 | Brundage et al. | |
| 7,333,957 B2 | 2/2008 | Levy et al. | |
| 7,340,076 B2 | 3/2008 | Stach et al. | |
| 7,349,552 B2 | 3/2008 | Levy et al. | |
| 7,359,528 B2 | 4/2008 | Rhoads | |
| 7,369,678 B2 | 5/2008 | Rhoads | |
| 7,372,976 B2 | 5/2008 | Rhoads et al. | |
| 7,377,421 B2 | 5/2008 | Rhoads | |
| 7,391,880 B2 | 6/2008 | Reed et al. | |
| 7,403,299 B2 | 7/2008 | Takahashi | |
| 7,406,214 B2 | 7/2008 | Rhoads et al. | |
| 7,415,129 B2 | 8/2008 | Rhoads | |
| 7,418,111 B2 | 8/2008 | Rhoads | |
| 7,424,131 B2 | 9/2008 | Alattar et al. | |
| 7,424,132 B2 | 9/2008 | Rhoads | |
| 7,427,030 B2 | 9/2008 | Jones et al. | |
| 7,433,491 B2 | 10/2008 | Rhoads | |
| 7,436,976 B2 | 10/2008 | Levy et al. | |
| 7,437,430 B2 | 10/2008 | Rhoads | |
| 7,444,000 B2 | 10/2008 | Rhoads | |
| 7,444,353 B1 | 10/2008 | Chen | |
| 7,444,392 B2 | 10/2008 | Rhoads et al. | |
| 7,450,734 B2 | 11/2008 | Rodriguez et al. | |
| 7,454,035 B2 | 11/2008 | Miller et al. | |
| 7,460,726 B2 | 12/2008 | Levy et al. | |
| 7,461,136 B2 | 12/2008 | Rhoads | |
| 7,466,840 B2 | 12/2008 | Rhoads | |
| 7,486,799 B2 | 2/2009 | Rhoads | |
| 7,499,564 B2 | 3/2009 | Rhoads | |
| 7,502,759 B2 | 3/2009 | Hannigan et al. | |
| 7,505,605 B2 | 3/2009 | Rhoads et al. | |
| 7,508,955 B2 | 3/2009 | Carr et al. | |
| 7,515,733 B2 | 4/2009 | Rhoads | |
| 7,532,741 B2 | 5/2009 | Stach | |
| 7,536,034 B2 | 5/2009 | Rhoads et al. | |
| 7,536,555 B2 | 5/2009 | Rhoads | |
| 7,537,170 B2 | 5/2009 | Reed et al. | |
| 7,539,325 B2 | 5/2009 | Rhoads et al. | |
| 7,545,951 B2 * | 6/2009 | Davis et al. | 382/100 |
| 7,545,952 B2 | 6/2009 | Brundage et al. | |
| 7,548,643 B2 | 6/2009 | Davis et al. | |
| 7,555,139 B2 | 6/2009 | Rhoads et al. | |
| 7,562,392 B1 | 7/2009 | Rhoads et al. | |
| 7,564,992 B2 | 7/2009 | Rhoads | |
| 7,565,294 B2 | 7/2009 | Rhoads | |
| 7,567,686 B2 | 7/2009 | Rhoads | |
| 7,570,784 B2 | 8/2009 | Alattar | |
| 7,577,273 B2 | 8/2009 | Rhoads et al. | |
| RE40,919 E | 9/2009 | Rhoads | |
| 7,587,602 B2 | 9/2009 | Rhoads | |
| 7,590,259 B2 | 9/2009 | Levy et al. | |
| 7,593,576 B2 | 9/2009 | Meyer et al. | |
| 7,602,940 B2 | 10/2009 | Rhoads et al. | |
| 7,602,977 B2 | 10/2009 | Rhoads et al. | |
| 7,602,978 B2 | 10/2009 | Levy et al. | |
| 7,606,390 B2 | 10/2009 | Rhoads | |
| 7,620,253 B2 | 11/2009 | Miller et al. | |
| 7,628,320 B2 | 12/2009 | Rhoads | |
| 7,639,837 B2 | 12/2009 | Carr et al. | |
| 7,643,649 B2 | 1/2010 | Davis et al. | |
| 7,650,009 B2 | 1/2010 | Rhoads | |
| 7,650,010 B2 | 1/2010 | Levy et al. | |
| 7,653,210 B2 | 1/2010 | Rhoads | |
| 7,657,058 B2 | 2/2010 | Sharma | |
| 7,672,477 B2 | 3/2010 | Rhoads | |
| 7,676,059 B2 | 3/2010 | Rhoads | |

| Patent/Publication | Date | Name |
|---|---|---|
| 7,685,426 B2 | 3/2010 | Ramos et al. |
| 7,685,537 B2 * | 3/2010 | Hoyle .......................... 715/854 |
| 7,693,300 B2 | 4/2010 | Reed et al. |
| 7,693,965 B2 | 4/2010 | Rhoads |
| 7,697,719 B2 | 4/2010 | Rhoads |
| 7,702,511 B2 | 4/2010 | Rhoads |
| 7,711,143 B2 | 5/2010 | Rhoads |
| 7,711,564 B2 | 5/2010 | Levy et al. |
| 7,720,249 B2 | 5/2010 | Rhoads |
| 7,720,255 B2 | 5/2010 | Rhoads |
| 7,724,919 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,902 B2 | 7/2010 | Rhoads |
| 7,760,905 B2 * | 7/2010 | Rhoads et al. ............... 382/100 |
| 7,762,468 B2 | 7/2010 | Reed et al. |
| 7,787,653 B2 | 8/2010 | Rhoads |
| 7,792,325 B2 | 9/2010 | Rhoads et al. |
| 7,796,826 B2 | 9/2010 | Rhoads et al. |
| 7,805,500 B2 | 9/2010 | Rhoads |
| 7,822,225 B2 | 10/2010 | Alattar |
| 7,831,062 B2 | 11/2010 | Stach |
| 7,837,094 B2 | 11/2010 | Rhoads |
| 7,916,354 B2 | 3/2011 | Rhoads |
| 7,917,083 B2 * | 3/2011 | Tang .......................... 455/3.06 |
| 7,930,546 B2 | 4/2011 | Rhoads et al. |
| 7,936,900 B2 | 5/2011 | Rhoads |
| 7,945,781 B1 | 5/2011 | Rhoads |
| 7,949,147 B2 | 5/2011 | Rhoads et al. |
| 7,949,149 B2 | 5/2011 | Rhoads et al. |
| 7,953,270 B2 | 5/2011 | Rhoads |
| 7,953,824 B2 | 5/2011 | Rhoads et al. |
| 7,970,167 B2 * | 6/2011 | Rhoads .......................... 382/100 |
| 7,991,778 B2 * | 8/2011 | Hull et al. .................... 707/741 |
| 8,045,756 B2 * | 10/2011 | Hein, III ..................... 382/100 |
| 8,051,169 B2 * | 11/2011 | Rhoads ........................ 709/225 |
| 8,069,169 B2 * | 11/2011 | Fitzpatrick et al. ........... 707/732 |
| 8,095,796 B2 * | 1/2012 | Conwell et al. .............. 713/176 |
| 8,176,054 B2 * | 5/2012 | Moraleda .................... 707/743 |
| 8,180,844 B1 * | 5/2012 | Rhoads et al. ............... 709/217 |
| 2001/0011233 A1 | 8/2001 | Narayanaswami |
| 2001/0021978 A1 | 9/2001 | Okayasu et al. |
| 2001/0022848 A1 | 9/2001 | Rhoads |
| 2001/0028725 A1 | 10/2001 | Nakagawa et al. |
| 2001/0032312 A1 | 10/2001 | Runje |
| 2001/0034705 A1 | 10/2001 | Rhoads et al. |
| 2001/0044744 A1 | 11/2001 | Rhoads |
| 2001/0047426 A1 | 11/2001 | Hunter |
| 2001/0053234 A1 | 12/2001 | Rhoads |
| 2001/0055407 A1 | 12/2001 | Rhoads |
| 2002/0009208 A1 | 1/2002 | Alattar et al. |
| 2002/0023020 A1 | 2/2002 | Kenyon et al. |
| 2002/0028000 A1 | 3/2002 | Conwell |
| 2002/0069370 A1 | 6/2002 | Mack |
| 2002/0080995 A1 | 6/2002 | Rhoads |
| 2002/0122568 A1 | 9/2002 | Zhao |
| 2002/0131076 A1 | 9/2002 | Davis |
| 2002/0136429 A1 | 9/2002 | Stach et al. |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0021440 A1 | 1/2003 | Rhoads |
| 2003/0023421 A1 | 1/2003 | Finn |
| 2003/0040957 A1 | 2/2003 | Rodriguez et al. |
| 2003/0097338 A1 | 5/2003 | Mankovich |
| 2003/0105730 A1 | 6/2003 | Davis et al. |
| 2003/0130954 A1 | 7/2003 | Carr et al. |
| 2003/0133592 A1 | 7/2003 | Rhoads |
| 2003/0138128 A1 | 7/2003 | Rhoads |
| 2004/0005093 A1 | 1/2004 | Rhoads |
| 2004/0049540 A1 | 3/2004 | Wood |
| 2004/0057581 A1 | 3/2004 | Rhoads |
| 2004/0128514 A1 | 7/2004 | Rhoads |
| 2004/0169581 A1 | 9/2004 | Petrovic |
| 2004/0181671 A1 | 9/2004 | Brundage et al. |
| 2004/0190750 A1 | 9/2004 | Rodriguez et al. |
| 2004/0240704 A1 | 12/2004 | Reed |
| 2004/0263911 A1 | 12/2004 | Rodriguez et al. |
| 2004/0264733 A1 | 12/2004 | Rhoads et al. |
| 2005/0013462 A1 | 1/2005 | Rhoads |
| 2005/0041835 A1 | 2/2005 | Reed et al. |
| 2005/0043018 A1 | 2/2005 | Kawamoto |
| 2005/0058318 A1 | 3/2005 | Rhoads |
| 2005/0192933 A1 | 9/2005 | Rhoads et al. |
| 2005/0249374 A1 | 11/2005 | Levy |
| 2006/0013435 A1 | 1/2006 | Rhoads |
| 2006/0028689 A1 | 2/2006 | Perry et al. |
| 2006/0041591 A1 | 2/2006 | Rhoads |
| 2006/0062386 A1 | 3/2006 | Rhoads |
| 2006/0251291 A1 | 11/2006 | Rhoads |
| 2007/0016790 A1 | 1/2007 | Brundage et al. |
| 2007/0055884 A1 | 3/2007 | Rhoads |
| 2007/0100757 A1 | 5/2007 | Rhoads |
| 2007/0108287 A1 | 5/2007 | Davis et al. |
| 2007/0172098 A1 | 7/2007 | Rhoads et al. |
| 2007/0180251 A1 | 8/2007 | Carr et al. |
| 2007/0185840 A1 | 8/2007 | Rhoads |
| 2007/0195987 A1 | 8/2007 | Rhoads |
| 2007/0201835 A1 | 8/2007 | Rhoads |
| 2007/0208805 A1 | 9/2007 | Rhoads et al. |
| 2007/0250194 A1 | 10/2007 | Rhoads et al. |
| 2007/0250716 A1 | 10/2007 | Rhoads et al. |
| 2007/0276841 A1 | 11/2007 | Rhoads et al. |
| 2007/0276928 A1 | 11/2007 | Rhoads et al. |
| 2008/0028223 A1 | 1/2008 | Rhoads |
| 2008/0121728 A1 | 5/2008 | Rodriguez |
| 2008/0126359 A1 | 5/2008 | Rhoads |
| 2008/0131083 A1 | 6/2008 | Rhoads |
| 2008/0131084 A1 | 6/2008 | Rhoads |
| 2008/0133416 A1 | 6/2008 | Rhoads |
| 2008/0133555 A1 | 6/2008 | Rhoads et al. |
| 2008/0133556 A1 | 6/2008 | Conwell et al. |
| 2008/0134255 A1 | 6/2008 | Ferris |
| 2008/0140573 A1 | 6/2008 | Levy et al. |
| 2008/0149713 A1 | 6/2008 | Brundage |
| 2008/0253740 A1 | 10/2008 | Rhoads |
| 2008/0275906 A1 | 11/2008 | Rhoads et al. |
| 2008/0292134 A1 | 11/2008 | Sharma et al. |
| 2008/0319859 A1 | 12/2008 | Rhoads |
| 2009/0012944 A1 | 1/2009 | Rodriguez et al. |
| 2009/0125475 A1 | 5/2009 | Rhoads et al. |
| 2009/0125607 A1 | 5/2009 | Rhoads |
| 2009/0129627 A1 | 5/2009 | Levy et al. |
| 2009/0172128 A1 | 7/2009 | Rhoads |
| 2009/0177742 A1 | 7/2009 | Rhoads et al. |
| 2009/0232352 A1 | 9/2009 | Carr et al. |
| 2009/0252401 A1 | 10/2009 | Davis et al. |
| 2009/0286572 A1 | 11/2009 | Rhoads et al. |
| 2009/0290754 A1 | 11/2009 | Rhoads |
| 2010/0008534 A1 | 1/2010 | Rhoads |
| 2010/0008536 A1 | 1/2010 | Rhoads |
| 2010/0008537 A1 | 1/2010 | Rhoads |
| 2010/0008586 A1 | 1/2010 | Meyer et al. |
| 2010/0009722 A1 | 1/2010 | Levy et al. |
| 2010/0021004 A1 | 1/2010 | Rhoads |
| 2010/0027837 A1 | 2/2010 | Levy et al. |
| 2010/0027969 A1 | 2/2010 | Alattar |
| 2010/0036881 A1 | 2/2010 | Rhoads et al. |
| 2010/0045816 A1 | 2/2010 | Rhoads |
| 2010/0046744 A1 | 2/2010 | Rhoads et al. |
| 2010/0062819 A1 | 3/2010 | Hannigan et al. |
| 2010/0067737 A1 | 3/2010 | Miller et al. |
| 2010/0114705 A1 * | 5/2010 | Hoyle ....................... 705/14.54 |
| 2010/0119108 A1 | 5/2010 | Rhoads |
| 2010/0131767 A1 | 5/2010 | Rhoads |
| 2010/0138012 A1 | 6/2010 | Rhoads |
| 2010/0142749 A1 | 6/2010 | Ellingson et al. |
| 2010/0142752 A1 | 6/2010 | Rhoads et al. |
| 2010/0146285 A1 | 6/2010 | Rhoads et al. |
| 2010/0150395 A1 | 6/2010 | Davis et al. |
| 2010/0163629 A1 | 7/2010 | Rhoads et al. |
| 2010/0172540 A1 | 7/2010 | Davis et al. |
| 2010/0185306 A1 | 7/2010 | Rhoads |
| 2010/0198941 A1 | 8/2010 | Rhoads |
| 2010/0322035 A1 | 12/2010 | Rhoads et al. |

| | | |
|---|---|---|
| 2011/0007936 A1 | 1/2011 | Rhoads |
| 2011/0026777 A1 | 2/2011 | Rhoads et al. |
| 2011/0040780 A1 | 2/2011 | Rhoads |
| 2011/0051998 A1 | 3/2011 | Rhoads |
| 2011/0058707 A1 | 3/2011 | Rhoads et al. |
| 2011/0062229 A1 | 3/2011 | Rhoads |
| 2011/0066734 A1 | 3/2011 | Rhoads |
| 2011/0091066 A1 | 4/2011 | Alattar |
| 2011/0208582 A1* | 8/2011 | Hoyle ................. 705/14.49 |
| 2011/0238506 A1* | 9/2011 | Perkowski et al. ..... 705/14.73 |

FOREIGN PATENT DOCUMENTS

| | | |
|---|---|---|
| WO | WO9904568 | 1/1999 |
| WO | WO0058883 | 10/2000 |
| WO | WO0104870 | 1/2001 |
| WO | WO 0106703 | 1/2001 |
| WO | WO0115021 | 3/2001 |

OTHER PUBLICATIONS

Office Action on Korean Application 10-2010-700716, dated Dec. 30, 2010 (with English summary).

Boney et al., "Digital Watermarks for Audio Signals," IEEE Proceedings of Multimedia '96, 1996, pp. 473-480.

Bender et al., "Techniques for Data Hiding," SPIE vol. 2420, 1996, pp. 164-173.

U.S. Appl. No. 08/154,866, filed Nov. 18, 1993, Geoffrey B. Rhoads.
U.S. Appl. No. 08/215,289, filed Mar. 17, 1994, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis, et al.
U.S. Appl. No. 09/292,569, filed Apr. 15, 1999, Geoffrey B. Rhoads, et al.
U.S. Appl. No. 09/337,590, filed Jun. 21, 1999, Geoffrey B. Rhoads.
U.S. Appl. No. 09/343,104, filed Jun. 29, 1999, Tony F. Rodriguez, et al.
U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/491,534, filed Jan. 26, 2000, Bruce L. Davis, et al.
U.S. Appl. No. 09/496,380, filed Feb. 2, 2000, Geoffrey B. Rhoads.
U.S. Appl. No. 09/507,096, filed Feb. 17, 2000, Geoffrey B. Rhoads, et al.
U.S. Appl. No. 09/515,826, filed Feb. 29, 2000, Geoffrey B. Rhoads.
U.S. Appl. No. 09/531,076, filed Mar. 18, 2000, Geoffrey B Rhoads, et al.
U.S. Appl. No. 09/552,998, filed Apr. 19, 2000, Tony F. Rodriguez, et al.
U.S. Appl. No. 09/562,517, filed May 1, 2000, Bruce L. Davis, et al.
U.S. Appl. No. 09/567,405, filed May 8, 2000, Geoffrey B. Rhoads, et al.
U.S. Appl. No. 09/574,726, filed May 18, 2000, Geoffrey B. Rhoads.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L Davis, et al.
U.S. Appl. No. 12/942,735, filed Nov. 9, 2010, John Stach.
U.S. Appl. No. 13/084,981, filed Apr. 12, 2011, Geoffrey B. Rhoads.
U.S. Appl. No. 13/089,816, filed Apr. 19, 2011, Geoffrey B Rhoads, et al.

Blackburn, et al., "A Tool for Content Based Navigation of Music," ACM Multimedia 98. deRoure, "Multiagent System for Content Based Navigation of Music," ACM Multimedia, Oct. 1999, pp. 1-14.

Foote, "An Overview of Audio Information Retrieval," Multimedia Systems, v.7 n. 1, pp. 2-10, Jan. 1999.

Ghias et al, "Query by Humming: Musical Information Retrieval in an Audio Database," ACM Multimedia, pp. 231-236, Nov. 1995, 6 pages.

Kageyama et al, "Melody Retrieval with Humming," Proceedings of Int'l Computer Music Conference (ICMC), 1993, pp. 1-3.

Smith, et al, "Music Information Retrieval Using Audio Input." Proc AAAI Spring Symposium on Intelligent Integration and Use of Text, Image, Video and Audio Corpora, pp. 1-5.

Wold et al, "Content-Based Classification, Search, and Retrieval of Audio," IEEE Multimedia Magazine, Fall, 1996, pp. 27-36.

* cited by examiner

METHODS FOR LINKING FROM OBJECTS TO REMOTE RESOURCES

RELATED APPLICATION DATA

This application is a continuation of application Ser. No. 09/531,076, filed Mar. 18, 2000, which is incorporated herein by reference.

The subject matter of the present application is related to that disclosed in the following applications, each of which is incorporated herein by reference:

Ser. No. 09/476,460, filed Dec. 30, 1999 (now U.S. Pat. No. 6,813,366);

Ser. No. 09/343,104, filed Jun. 29, 1999 (now abandoned in favor of continuation application Ser. No. 10/764,430, filed Jan. 23, 2004);

Ser. No. 09/314,648, filed May 19, 1999 (now U.S. Pat. No. 6,681,028);

60/134,782, filed May 19, 1999 (now published as an appendix in U.S. Pat. No. 6,311,214);

Ser. No. 09/292,569, filed Apr. 15, 1999 (now abandoned in favor of continuation application Ser. No. 10/379,393, filed Mar. 3, 2003, which is now U.S. Pat. No. 7,263,203);

60/164,619, filed Nov. 10, 1999;

60/141,763, filed Jun. 30, 1999; and

60/082,228, filed Apr. 16, 1998.

TECHNICAL FIELD

The present technology relates to data networking, e.g., systems for linking between objects and associated resources remote resources.

BACKGROUND AND SUMMARY

The technology detailed below has many novel aspects and applications. For expository convenience, this disclosure focuses on one particular application—a system for linking print media to electronic content. The technology, however, is not so limited, and may more generally be viewed as a system for linking any object (physical or electronic) to a corresponding networked or local resource.

In accordance with the illustrative application, an imperceptible code is embedded within print media, such as magazine advertisements or articles, direct mail coupons or catalogs, bank- or credit-cards, and business cards. When recognized by a suitably-enabled PC camera, that code automatically directs an associated web browser to a destination chosen by the producer of the print media. That destination, e.g., a web page, can provide additional information or services—more timely and/or more extensive than that provided by the print material. By such arrangement, more efficient internet navigation and access is provided to consumers, and more effective means for linking readers to e-commerce points of sale is provided to advertisers.

The foregoing and additional features and advantages of the inventors' technology will be more readily apparent from the following detailed description, which proceeds with reference to the accompanying drawings.

DETAILED DESCRIPTION

Figure 1:
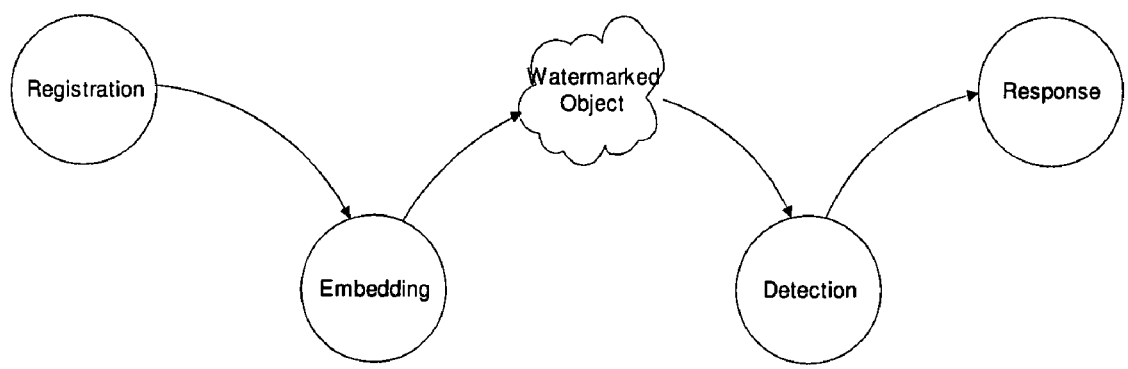
FIG. 1 is a diagram showing the principal process components of an illustrative system.

Before beginning a detailed exposition, it may be helpful to provide an overview of the larger system of which the present technology forms a part. As shown in FIG. 1, the larger system entails four basic processes—registering, embedding, detection and response.

Registering refers to the process of assigning an ID to an object, and associating that ID with a corresponding action or response. Additional steps can be included, such as logging the name and/or organization of the registrant, the name of the product, a description of the object and a context in which it is found (magazine, book, audio track, etc.), etc.

Embedding refers to the process of encoding of an object with a digital identifier (e.g., a watermark conveying a serial number in its payload).

Detection is the complementary operation to embedding, i.e., discerning a digital identifier from an object.

Response refers to the action taken based on the discerned identifier.

The middle two steps—embedding and detection—can employ any of myriad well-known technologies, including bar codes, data glyphs, metadata, file header information, RF ID, UV/IR identifiers, organic transistors, and other machine-readable indicia and techniques for associating plural-bit digital data with an electronic or physical object. The detailed embodiment employs watermarking technology, although this is illustrative only.

A great number of particular watermarking techniques are known. The reader is presumed to be familiar with the literature in this field. Particular techniques for embedding and detecting watermarks are detailed in the present assignee's copending application Ser. No. 09/503,881, filed Feb. 14, 2000 (now U.S. Pat. No. 6,614,914). Other watermarking techniques for images and video are known from published patents to NEC (inventor Cox et al), IBM (inventors Morimoto and Braudaway et al), Dice (inventor Cooperman), Philips (inventors Kalker, Linnartz, Talstra, etc. Audio watermarking techniques are known from published patents to Aris (inventor Winograd, Metois, Wolosewicz, etc.), Solana (inventor Lee, Warren, etc.), Dice, AudioTrack, Philips, etc.

Figure 2:
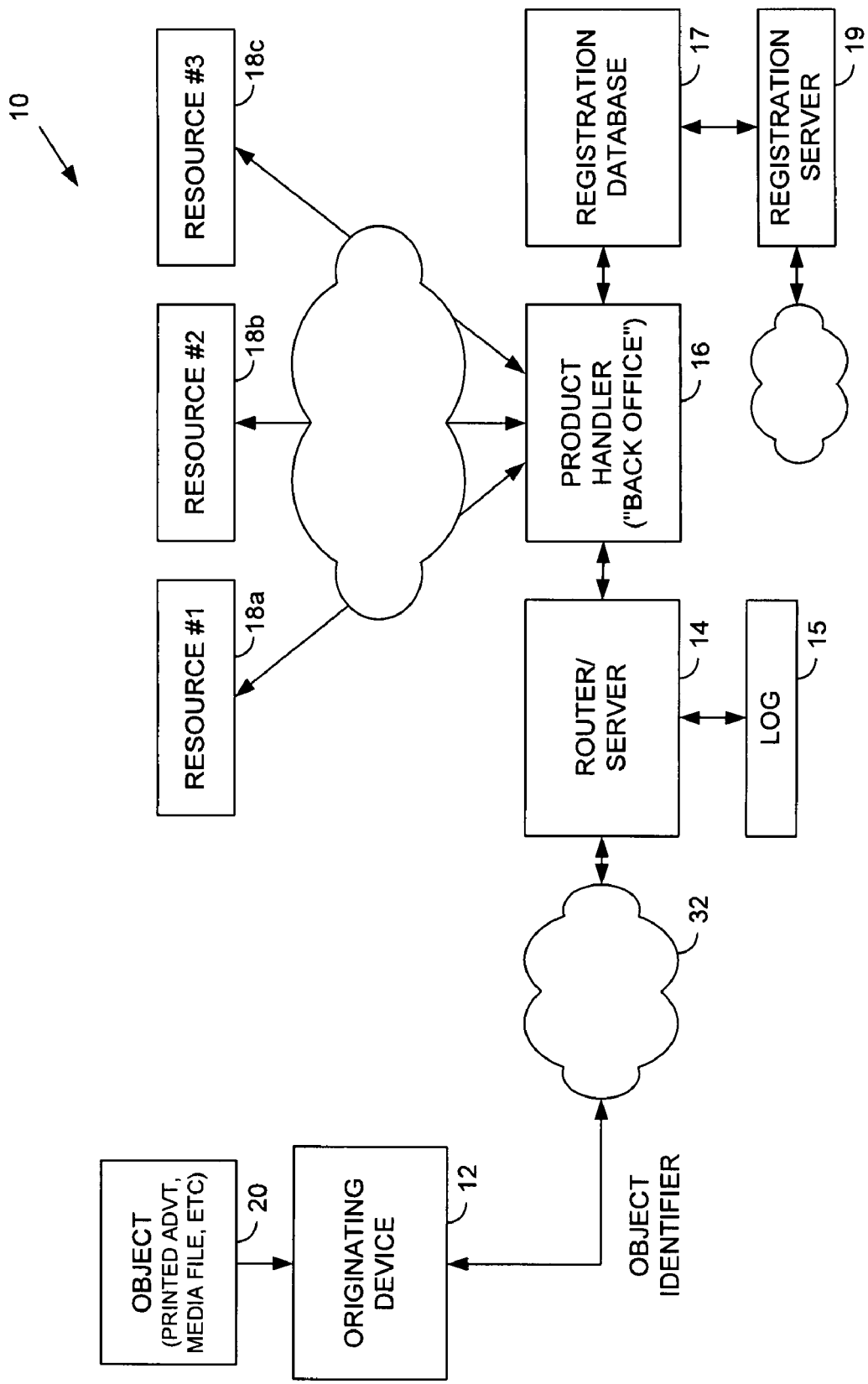
FIG. 2 is a block diagram showing an illustrative system for performing the response process of FIG. 1.
Figure 3:
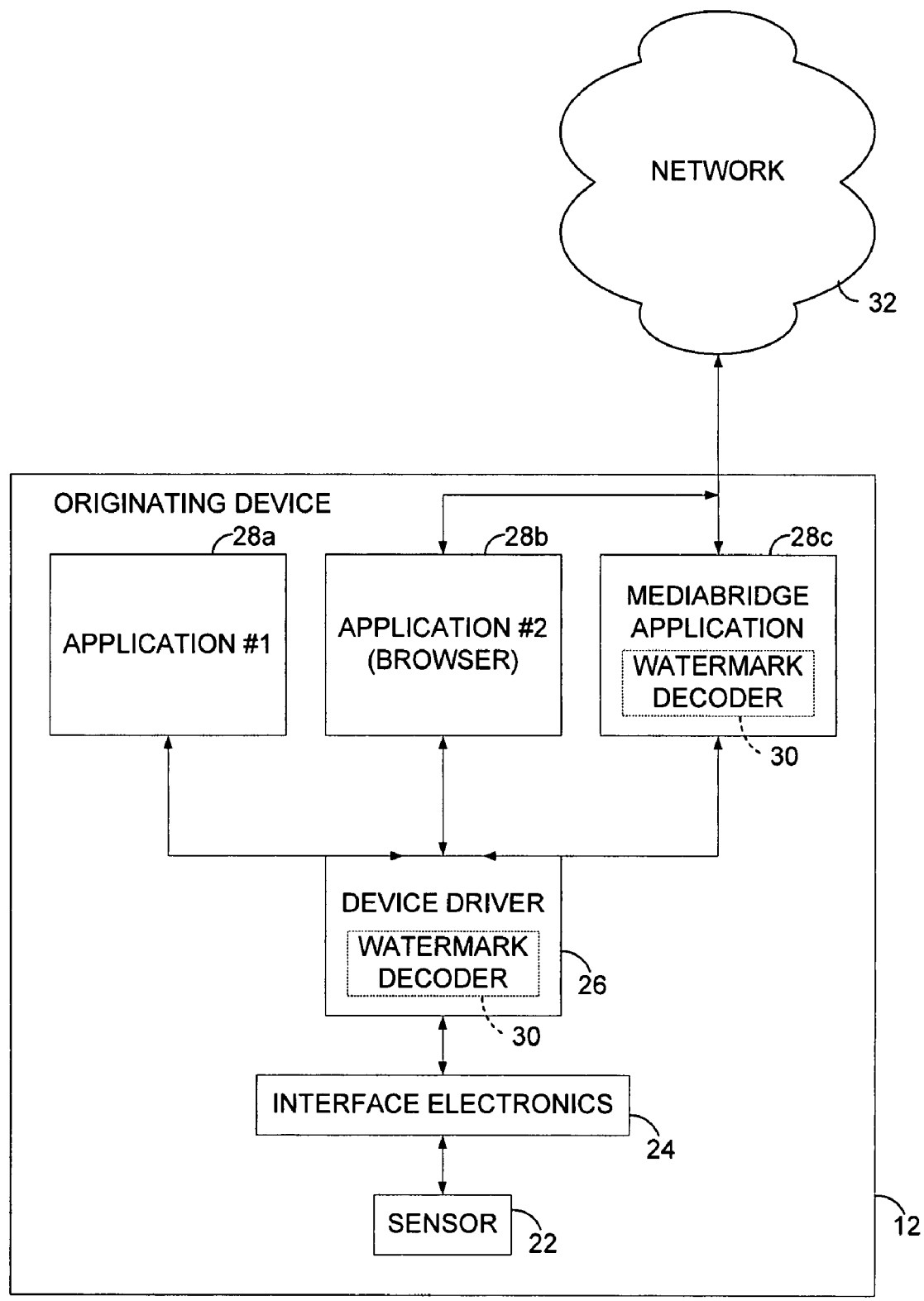
FIG. 3 is a block diagram more particularly detailing an originating device used in the system of FIG. 2.

Referring to FIG. 2, a system 10 according to one embodiment of the present technology includes an originating device 12, a router/server 14, a product handler 16, a registration database 17, and one or more remote resources 18.

The originating device 12 can take many different forms, e.g., a cell phone, a personal digital assistant (e.g., a Palm Pilot), a personal computer, a barcode scanning system, etc. For expository convenience, the embodiment is described with reference to a personal computer for device 12.

Device 12 interacts with an object 20. The object can be electronic or not. Electronic objects 20 can include computer files, representations of audio, video, or still imagery (e.g., files or in streaming form), etc. Non-electronic objects can include physical objects such as newspapers, magazine pages, posters, product packaging, event tickets, credit cards, paper currency, etc. Non-electronic objects can also include sounds produced by loudspeakers.

When used with non-electronic objects, device 12 (FIG. 2) typically includes some form of sensor or transducer 22 to produce electronic signals or data corresponding to the object. Examples include CCD- or CMOS-based optical sensors (either as part of still—or video cameras, flatbed scanners, mice, or otherwise), microphones, barcode scanners, RF ID sensors, mag stripe readers, etc. In such cases, the sensor 22 may be coupled to associated interface electronics 24, which in turn may be coupled to device driver software 26, which in turn may be coupled to one or more application programs 28. Device driver software 26 serves as a software interface, communicating at a relatively high level with the application programs 28 (e.g., through API instructions whose content and format are standardized to facilitate application programming), and at a relatively low level with the interface electronics 24.

The detailed embodiment contemplates that the object 20 is a magazine advertisement encoded with a steganographic watermark conveying a plural bit object identifier. The watermark is hidden in the advertisement's image in a manner indiscernable to human observers, but detectable by computer analysis. That analysis is performed by a watermark detector 30.

Watermark detector 30 can be implemented in various different locations in the system of FIG. 1. Typically, the detector is implemented in the originating device 12, e.g., in the driver software 26, or in application software 28c that serves to link to external resources based on detected watermarks. But it may be implemented elsewhere, e.g., in hardware in the interface electronics 24, in an operating system associated with the device, or outside device 12 altogether. Some systems may have plural watermark detectors, implemented at different locations throughout the system.

In an illustrative system, the watermark detector is implemented in the device driver 26. Functionality of the detector is made available to the application program 28c through one or more APIs specific to watermark-related functions. One function is reading of the watermark data payload from the object 20.

The illustrated application 28c is a software program that serves to communicate the watermark data from the device 12 to the router/server 14 through one or more communications links 32 (e.g., the internet). Application 28c also receives information from the communication links 32 and presents same to the user (or otherwise uses same).

The router/server 14 is a high capacity computer including one or more CPUs, memory, disks, and I/O ports. As is familiar to artisans, the disks store operating system software and application programs, together with data, that are transferred to the memory as needed by the CPU. The router essentially serves as a middleman between the application 28c and the product handler 16. As detailed below, the router receives requests from the application, logs them in a transaction log 15, and passes them on to the appropriate product handler.

As more particularly detailed below, the handler 16 provides a response in accordance with the particular watermark payload. The response may be provided directly by the product handler to the device 12, or the handler may respond by communicating with a remote resource 18 (which may be, e.g., a data repository or service provider).

In the former case, the handler 16 may identify a URL corresponding to the watermark (using the database 17), and return the URL to the application 28c. Application 28c can then pass the URL to a web browser 28b in the device 12, and initiate a link to the internet site identified by the URL. Or the handler may have some locally stored data (e.g., audio or video, or software updates) and send it to the device 12 in response to the watermark.

In the latter case, the handler 16 does not respond directly to the device 12. Instead, the handler responds by communicating with a remote resource 18. The communication can be as simple as logging receipt of the watermark message in a remote repository. Or it can be to authenticate device 12 (or a user thereof) to a remote resource in anticipation of a further transaction (e.g., the communication can form part of an on-line licensing or digital rights management transaction). Or the communication can request the remote resource to provide data or a service back to device 12 or to another destination (e.g., to initiate an FTP file transfer, or to request that a song selection identified by the watermark be downloaded to a user's personal music library, or to update software installed on device 12).

In still other cases, hybrids of the two foregoing cases can be employed, e.g., handler 16 can send some data back to device 12, while also communicating with a remote resource 18.

In some cases, the response returned to the device 12 by handler 16 (or a remote resource 18) can serve to trigger some further action by the device 12. For example, the response returned to device 12 can include a WindowsMedia audio file, together with a request that the device 12 launch the WindowsMedia player installed on the device. (The launching of a browser pointed to a URL is another example of such triggering.)

The illustrated product handler 16 comprises essentially the same hardware elements as the router 14, e.g., CPU, memory, etc. Although FIG. 2 shows just one product handler, several product handlers can be included in the system—either co-located of geographically distributed. Different handlers can be dedicated to different functions (e.g., serving URLs, serving music, etc.) or to different watermark sources (e.g., one responds to watermarks found in audio, another responds to watermarks found in print advertising, etc.). Further specialization may also be desirable (e.g., one handler may respond to advertising placed by Ford, another may respond to advertising placed by Chevrolet; or one handler may respond to advertising appearing in Wired magazine, another may respond to advertising appearing in Time magazine, etc.). In one particular implementation, the router 14 dispatches the incoming data to one of several handlers in accordance with (1) the vendor of the originating application 28c, and (2) the particular identity of the application 28c.

The following discussion focuses on the data exchanged between the application 28c, the router/server 14, the product handler 16, and the associated protocols, in one illustrative embodiment of the technology.

Concept of Operation

When shown a watermarked image, the application 28c analyzes the image and extracts the embedded watermark payload (more particularly detailed below) from the image. The application sends some or all of this information in a message format to the router 14.

The router 14 decodes the received message, looking for vendor and product information. Based on this information, it passes the message to a corresponding product handler 16.

The product handler receives the message and attempts to match the detected watermark serial number to a registered watermark serial number earlier stored in the database 17. If a match is found, the product handler performs the desired action. As noted, typical actions include returning a URL for web redirection, serving up an HTML page for initial user navigation, initiating software downloads, etc. If a match is not found, the product handler returns an error code and message to the application 28c. If a match is found, but the corresponding action is unavailable, incomplete, inactive or invalid, the product handler returns an error code and message to the calling application.

Figure 4:
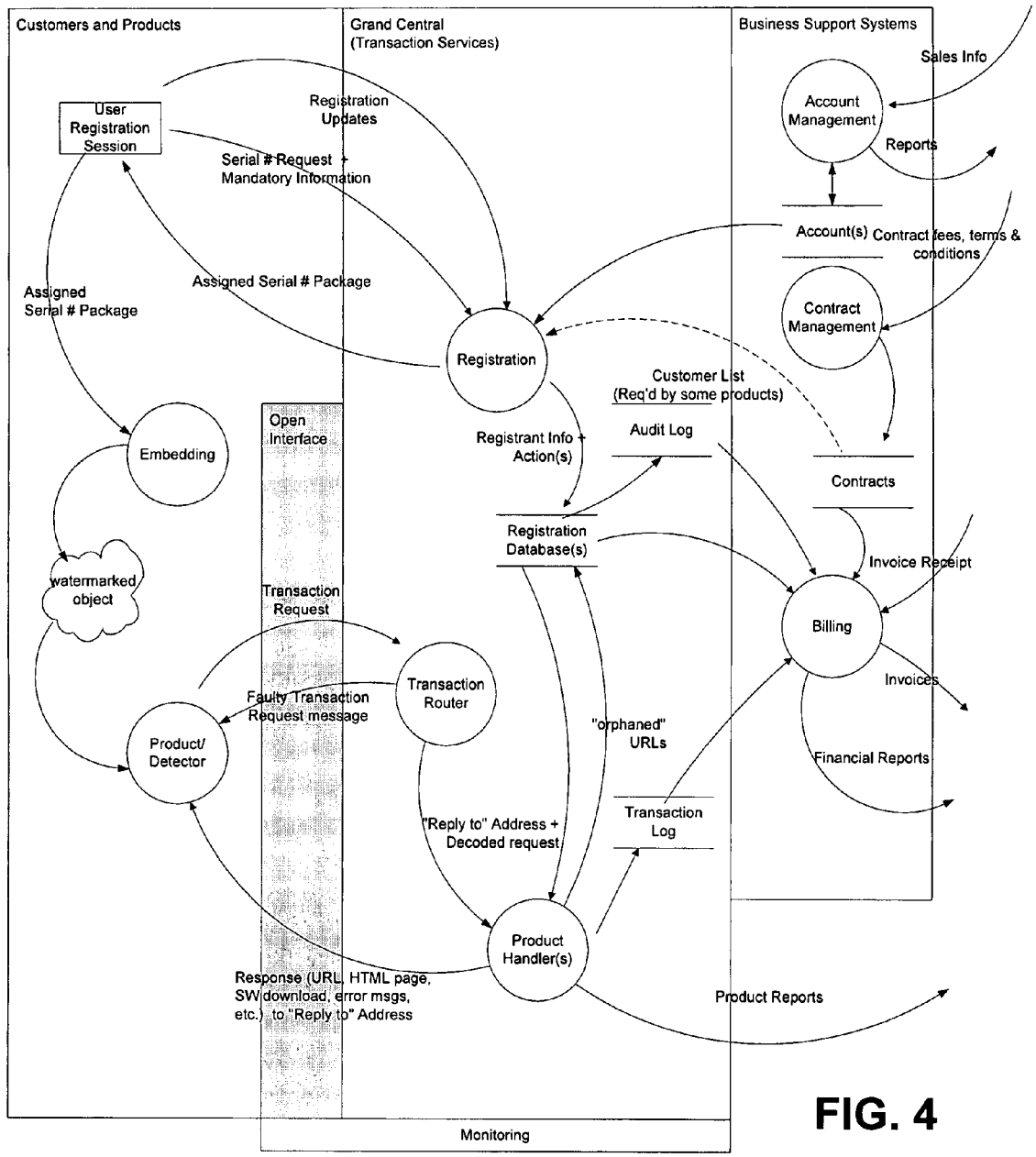
FIG. 4 illustrates certain top level data flows in the system of FIG. 2.

A generalized view of the foregoing is provided in FIG. 4.

(Note that while the system may concentrate on a certain type of object 20, and a certain vendor's application 28c, the architecture is constructed to support accessing product handlers from other vendors and corresponding to other objects. This concept makes the system suitable as a clearinghouse for processing all machine-readable indicia on web-enabled devices.)

An exemplary detection and response cycle is illustrated below.

sage, and identifies the associated information/action. In the illustrated example the identification information includes:
Customer Account,
Object and associated attributes (name, description, expiration, etc.),
Action, and
Registered Serial Number (for registration updates)

The Customer Account identifies the watermark registrant. In most cases, this is also the party to be billed for services. For validation and security reasons, the Customer Account is required to be a known, existing account. Account information, including the account's password, is maintained by an Account Management system.

The Object and associated attributes identifies the object to be watermarked. The object attributes typically include the name and description of the object and a list of accounts authorized to access the object's registration. These autho-

| User | Application | Router | Product Handler |
|---|---|---|---|
| Shows object to sensor 22 | | | |
| | Acquires watermark Creates message packet Sends packet to product handler | | |
| | | Receives message packet Logs transaction Decodes packet Identifies product sending packet Passes packet to Product Handler corresponding to product | |
| | | | Logs received packet Validates packet serial number If not found, returns error packet to application Else, returns packet with data/action back to application (e.g., URL) |
| | Receives packet If error, display error message Else, display data or perform the requested action (e.g., launch browser and link based on received URL) | | |
| Sees the data/action associated with the object (e.g., views web page) | | | |

The present system generalizes this example to support any product from any vendor that is capable of sending a message via the Internet that complies with the expected request format (e.g., a product code, message type, and identifier) and receiving a message in a corresponding response format. One set of message formats suitable for use in such a system are described in more detail below.

Watermark Registration—the First Step in the Process

In order for the system to identify the response (e.g., a URL) that corresponds to an object identifier (e.g., a watermark), this data must first be associated within the database 17 in association with the watermark to which it corresponds. The watermark registration process captures some basic identification information used later to validate the incoming mesrized "supporting" accounts are typically the ad agencies, pre-press houses, etc. involved in the watermark embedding process in the print advertising example contemplated herein.

The Action defines the response the customer desires when the watermark is detected. It varies by product, but in the illustrative embodiment involves the return of some additional information regarding the watermarked object. In the illustrative system, the action is return of a URL or HTML to be used to display a web page associated with the watermarked object. For other products, the desired response may be display of the object's owner & rights information, software/data downloads, delivery of streamed audio or video, presentation of an advertisement, initiation of object-based actions, etc.

The Registered Serial Number forms the last component of the registration. It is this assigned vendor and product-unique identifier that allows the system to acquire the specific information/action for the object in question.

A Few Key Product Registration Concepts—

Watermark Registration is a Product-Specific Process—

To allow each of the products the freedom to upgrade their capabilities without impacting any other product function or schedule, the registration process is product-specific.

Watermark Registration is Web-Enabled—

The exemplary registration is a web-enabled process that requests the basic identifying information from the object owner (publisher, ad agency, studio, etc.) and returns to the registrant a packet with a unique identifier to be embedded within the object. A watermark embedding application (i.e., software) uses this packet to embed the watermark type and serial number within the client's object. In the illustrative system, only one watermark may be embedded within a single object. In other embodiments, multiple watermarks may be embedded into a single object.

When a customer registers a watermark, the system associates the watermark serial number with the information provided by the customer during the registration process. The associated information may vary with different products. One set of associations, for the exemplary magazine advertisement objects, is shown in the following table:

Watermark Registrations Expire—

For some products, watermarks are granted only for a limited period of time. For these watermarks, the Registration process employs an expiration date for the assigned serial number. When the system receives a message requesting action for a serial number that has expired, an error is returned. Registrants may extend their watermark serial number expirations by updating the expiration date. Expiration extensions may result in customer charges.

Watermark Registration can be Completed in One or More Web Sessions—

Registration can be a single or multi-step process. If the media owner has all of the required information at the start of the process, the system can provide a simple web-enabled method for requesting a watermark serial number (s) on-line. With all of the information provided, the registration is considered "active." That is, it is available for immediate use by the consumer. If the registrant does not have all of the required information available at the initial session, by providing a minimum set of information (e.g., name and/or organization name+product), a product watermark serial number may still be issued for the registrant to use in the embedding process. The most typical use of this partial registration occurs when the actions associated with the media to be watermarked (e.g., URL, etc.) are not yet known. The partially registered serial number is considered "inactive" until all of the required registration information has been completed. The system will

TABLE 1

Registration Database Elements

| Mandatory? | Information | Comments |
|---|---|---|
| Mandatory | Customer | Typically, the publisher |
| Mandatory | Publication(s) | Magazine(s) containing the ad |
| Mandatory | Issue Date | First date of the magazine/publication period |
| Optional | Volume | Magazine/publication volume information |
| Optional | Region Code | Optional information for regional publications |
| Optional | Location Code | Location of the object within the publication (e.g., page and, optionally, finer location data) |
| Mandatory | Watermark Type | Watermarks may have varying type. The type defines how to interpret the Serial Number |
| Mandatory | Serial Number | Assigned watermark number |
| Mandatory | Object Name | Customer's name for the object |
| Mandatory | Object Description | Customer's textual description of the object |
| Mandatory | Object Type | Ad or Editorial (and in other systems: Direct Mailer Card, Product Packaging, Coupon, Catalog, Business Card, Credit Card, etc.) |
| Optional | Campaign | For ads and promotions, the campaign name |
| Optional | Object size | Stated in fractions of the page (full page, half, etc.) |
| Mandatory | Effective Date | Date on which the user will first be able to initiate any actions. For publications, typically this is the "on stand" date |
| Mandatory | Expiration date | Date/time when the watermark expires |
| Mandatory | Primary Action | Initially the URL used for redirection |
| Mandatory | Primary Effective | Date the Primary action becomes effective |
| Mandatory | Primary Expires | Date the Primary action expires |
| Optional | Default Action | Reserved for future use (e.g., backup to the Primary action) |
| Optional | Default Effective | Date the Default action becomes effective |
| Optional | Default Expires | Date the Default action expires |
| Optional | E-mail address | Used to automatically notify the Customer of problems with the registration/Action |
| Mandatory | Status | Incomplete, active, inactive |
| Optional | Problem Indicator | Bad URL, slow site, etc. |
| Optional | Supporting Accounts | This field and its sub-fields are repeated for each supporting account |
| Optional | User Fields (4) | |
| Optional | Text | User Field free text |
| Optional | Viewable by Others? | Y/N. N hides the field form any other accounts | issue an error message if requested to process an "inactive" serial number. Whether active or inactive, these registrations may be considered billable items subject to the terms and conditions of the applicable contract(s).

Registrations can be updated by the customer to reflect new information and/or to complete a previous registration session. For example, a registered customer may request a watermark serial number without specifying the URL used to redirect the consumer. The system will assign a serial number so that the customer can continue with the embedding process, but the registration will not be considered complete until the customer updates the registration with the URL and any other mandatory information regarding this serial number.

Watermark Registrations are Secure—

Only the registrant and those accounts that the registrant authorizes can access specific watermark registrations.

In the illustrated system, the customer account that registers a watermark may grant permission to a specific ad agency and/or pre-press house to change certain fields within the registration as a normal part of their work. Each customer, agency and pre-press house needs an account on file to be granted access to watermark registrations. The Customer account is established as part of the contract process. For ad agencies and pre-press houses, the accounts are established on an as-needed basis, through a controlled web site accessible to the customer.

For all products, the same basic tenet holds—access to the registration information is limited to only explicitly authorized accounts. Accounts are password protected. For ad agencies and pre-press houses, a single password may be shared. In other embodiments, each part may be assigned a unique password.

Watermark Registration Changes are Logged—

All registration actions—creation, modification and deletion—are logged in an audit log. The authenticated username, the date/time of the action, and the action itself are all stored to provide a complete audit trail.

Figure 6:
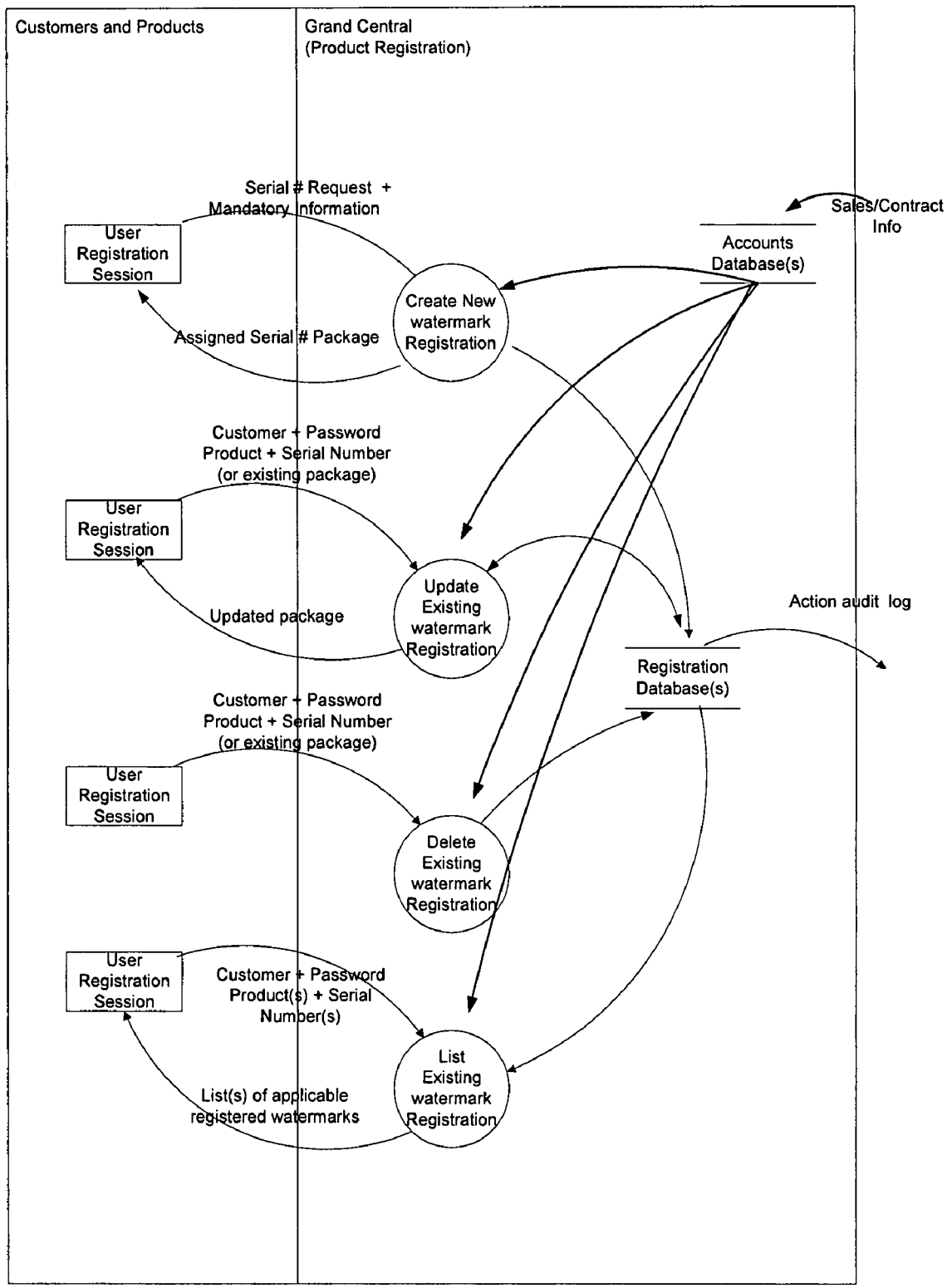
FIG. 6 illustrates certain data flows associated with the registration process of FIG. 2.
Figure 7:
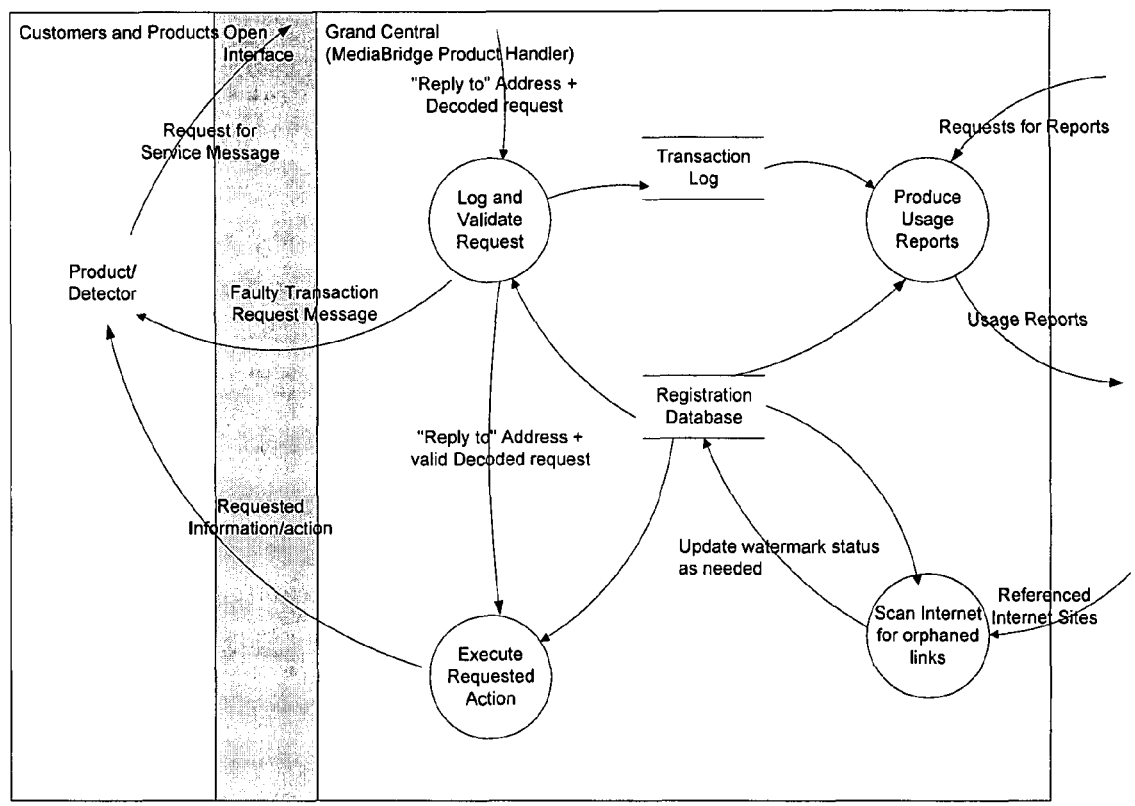
FIG. 7 illustrates certain data flows associated with the product handler of FIG. 2.

Processes and data flows associated with registration are illustrated in FIG. 6.

Entering Data into the Registration Database

While the client application, router, and product handler have initially been described in connection with responding to watermark information sensed from media objects, the same infrastructure can be employed earlier in the process, to enter data into the registration database 17. That is, a suitably configured variant of application 28c can be used by publishers, ad agencies, pre-press houses, etc., to (a) provide initial data to the database; (b) update such data; and (c) query the database for current values. Alternatively, a dedicated registration server 19 (FIG. 2) can be employed.

The involvement of plural parties in the registration process can be facilitated by encapsulating the database record contents for a given watermark in a file to which information is successively added (or updated) by different entities, and used to convey data between the database 17 and the cited entities.

Consider a case where Nike advertises in Wired magazine. The ad department at Wired agrees to sell space in response to a request from a media buyer at Nike. Wired may start the related watermark work by securing from the operator of system 10 a particular watermark identifier. (This, and most of the following procedures, are effected by computers talking to computers in accordance with instructions provided by suitable software used by the various participants, etc. In the discussion that follows, this software is the registration server 19 although, as noted, product handler 16 could be arranged to perform these functions.) Wired provides the operator an issue identifier (e.g., San Francisco edition of the July, 2000 issue), and internal tracking information used by the magazine. Registration server 19 responds by sending Wired a confirmatory file, by email, that encapsulates the information thus-far (i.e., the watermark identifier, the issue ID, and the magazine tracking information). Server 19 creates a new database record, and parses the received information into corresponding fields of the record.

Wired forwards the file received from the registration server to the media buyers at Nike. Nike supplements the information with its additional data, including the name of the advertisement and internal tracking information. It then forwards the updated file to server 19. Again, this server processes the file and updates the database record with the new information. It emails a confirmatory data file to both Nike and Wired, so each has the latest set of information.

The process continues in this fashion. Each entity provides new data to the registration server 19 via an emailed encapsulating file. The server updates the corresponding database record, and dispatches updated versions of the encapsulating file to the identified participants so each has the latest information.

Once Nike has entered its data via this process, it may forward the encapsulating file to its outside ad agency. The ad agency uses the file similarly, adding its particular information, and forwarding the file to the server. The server updates the database record accordingly, adds the ad agency to its email distribution list for encapsulating files, and dispatches the latest version of the file to Wired, Nike, and the ad agency.

A pre-press house may be the next party involved, and so forth.

Identification of the URL to which the watermark ID corresponds, and updating of the database record accordingly, may not happen until near the end of the process.

At any time, any of the parties can provide additional information to the database, and share such information with others, via the same process. (Some information may not be suitable for distribution to all involved parties, and can be flagged accordingly.)

Server 19 needn't always be the hub through which all communication takes place. The file as updated by Nike, for example, can be forwarded by Nike directly to its ad agency. The ad agency can add its information, and then provide the twice-updated file to the server, etc.

By using distributed files as proxies for the actual database record, a number of advantages accrue. One is local availability of the latest information by all parties without the need for an internet connection. Thus, if a creative director wants to work on the beach, or otherwise disconnected from the net, the needed information is still available. Another is the ease of integrating software tools at each of the parties with a file of local data specific to a particular advertisement, rather than requiring the architectural hassles of interfacing with a remote database and navigating its attendant authentication and security hurdles.

While the foregoing discussion made reference to emailing files, a typical email program would not normally be used. Instead, to better manage the attendant logistics, a specialized file management/mail program is used by each of the parties. Such program would track the latest file for each advertisement, making same readily available for updating as desired, and index the files by various content fields. The user interface could thus present a list of files, grouped or sorted by any of the database fields, permitting editing or adding of information just by clicking on a given field or tab.

Of course, the file-distribution system just-described isn't essential to the system. A great variety of other arrangements can naturally be employed. One is for each party to log-on to server 19 as needed to inspect, or update, database fields for which it has appropriate permissions.

Numbering Schemes

The payload information encoded into objects (e.g., by watermarking) can take a number of forms and sizes. Four exemplary classes are discussed below:

a) Domain-based payload segmentation;
b) Customer/usage-based payload segmentation;
c) Unsegmented payload; and
d) Unique ID Domain-Based Payload Segmentation Domain-based payload segmentation approaches divide the payload into fields, each with a distinct meaning.

Consider a payload of 60 bits. Twelve bits may form a Class ID. These bits serve as an identifier for a top-level domain. 24 other bits may form a DNS ID. These bits identify an intermediate level domain. Together, the Class and DNS IDs fully identify the class of objects from which the data originates, the customer, and the server that should respond to the payload. (Some responses may be handled by the client computer, rather than dispatched to a remote server.)

The remaining 24 bits are a User ID, and serve as the most granular identifier, indicating the particular source of the payload. Based on this ID, the responding server knows exactly which response is to be provided.

This payload is embedded, in its entirety, into the customer's object. When sensed by the client computer, the application 28c parses (decodes) the payload into Class ID, DNS ID and User ID fields. The Class ID is used to trigger one or more of the client- or server-side programs. Once "launched" these products then use the Class ID in conjunction with the DNS ID and the User ID to complete the desired action.

One of the Class IDs may signify the object is a magazine page. Based thereon, the application 28c may direct the payload to the router/handler described above for response. Another Class ID may signify that the object is music. Again, the application may direct the payload to the same router. Or the application may direct the payload to a service maintained by a music industry consortium for response. Still another Class ID may signify that the object is a grocery package, and the payload should be routed to an on-line grocer for response. Yet another Class ID may signify that the object is a business card, and the payload should be processed locally, at the client machine. The mapping between Class IDs, and the corresponding response mechanism to which the application 28c should direct the payload, may be maintained by a database associated with the client computer's operating system (e.g., the Windows Registry), as further detailed in application Ser. No. 09/343,104.

Once the payload has been dispatched to a proper response destination, that entity examines the DNS ID to further classify the correct responding entity. For example, different IDs may correspond to different classes of servers within a tree of servers.

One the payload has been directed to the correct class of servers, the User ID defines the terminal "leaf" in the tree (e.g., a database record) that finally defines the response.

Customer/Usage-Based Payload Segmentation

A second approach again employs a segmented payload technique. In this arrangement, however, a first field defines the interpretation of the following bits (e.g., their segmentation into different fields).

Again, consider an exemplary payload of 60 bits. Twelve bits can be a Version ID. These bits indicate how the succeeding bits are to be parsed and interpreted, and may indicate (like the Class ID in the foregoing approach) the particular application program 28c that should be used. The Version ID bits thus serve to indicate the payload type. In the illustrated embodiment, one of these types signifies that the payload is coming from a magazine page and should be handled accordingly. In this case, the remaining 48 bits can be parsed into three fields: Owner ID (15 bits), Publication ID (15 bits), and Media ID (18 bits).

The Owner ID identifies the customer to whom the watermark is registered (e.g., Nike). This is used for ad effectiveness analysis and billing purposes. The Publication ID identifies the particular publication (e.g., July, 2000, San Francisco edition of Wired Magazine). The Media ID identifies a particular page location within that publication.

As before, the payload is embedded in its entirety into the customer's object. The payload is first parsed to determine the Version ID. If the user's device 12 has been programmed to handle such objects locally, further parsing is performed in accordance with data corresponding to that Version ID, and associated processing of the parsed data is performed. If the device has been instructed to dispatch such payloads to remote locations for service, the complete payload can be dispatched with only such further parsing (if any) as may be required to correctly identify the corresponding remote servicing entity.

Unsegemented Payload

An unsegmented payload consists only of two parts: a Version ID (as described above) and an Object ID. In an illustrative case, a 60-bit payload is again used, with 12 bits serving as the Version ID, and the remaining 48 serving as the Object ID.

In this approach the relationships of owner/customer, publication, issue, and media are all maintained in database 17 rather than literally represented in some fashion within the object identifier.

Unique ID

This case is akin to the unsegmented payload, but consists of just a single field—a unique identifier. The same application 28c is always used, and always treats the payload data consistently (e.g., processing locally, or dispatching to a predetermined destination) regardless of the payload contents.

Combinations and hybrids of the foregoing approaches can of course be used. Moreover, the 60 bit payload length is illustrative only. Longer (e.g., up to 1024 bits) or shorter (e.g., down to 8 bit) payloads can naturally be used.

In a particular embodiment, a 31-bit unsegmented payload is used, consisting of 9 bits of payload type and 22 bits of watermark serial number. Some materials (e.g., advertisements including composite graphics) may be encoded with several serial numbers. The mapping between this payload and the customer/publication/etc., is maintained in database 17.

(As noted below, the data sent from the application 28c typically includes information other than the identifier payload, e.g., the type and version number of the application 28c, the electronic address of the dispatching application, etc.)

Router

The router 14 permits any number of different products to be used by the indicia detection and response model. By keeping this function separate and generalized, new products can be added without design changes to the existing products or the product handlers 16. There are two keys to making this approach successful—speed and flexibility. By using a standardized, open interface, the router is able to facilitate both of these goals.

A premise of an exemplary interface is an enveloping technique that allows the router to "open" the outer transaction envelope and extract the vendor and application ID without decoding the remainder of the transaction (message). Given these two pieces of information, the router uses a simple lookup table to determine the product handler appropriate to complete the transaction. The router then passes the vendor, application, remainder of the transaction and the Internet "reply to" address on to the appropriate product handler. The simplicity of this handling keeps the routing delay to a minimum, while deferring the actual response processing to vendor/product-specific handlers. By including the "reply to" address in the data passed on to the product handlers, the router is freed from the responsibility of return routing for the product's response(s).

To review, the router:

1. decodes the request packet received from the client products into the packet's base components—Vendor ID, Application ID and message;

2. validates the request packet base components against a list of known, good values;

3. if a request packet component is found to be invalid, issues an error message noting the invalid components and returning same to the calling session (e.g., product);

4. sends the decoded request packet contents and any required identification of the calling session to the appropriate product handler; and 5. reports any errors encountered, including invalid packets received, to a system monitor.

Figure 5:
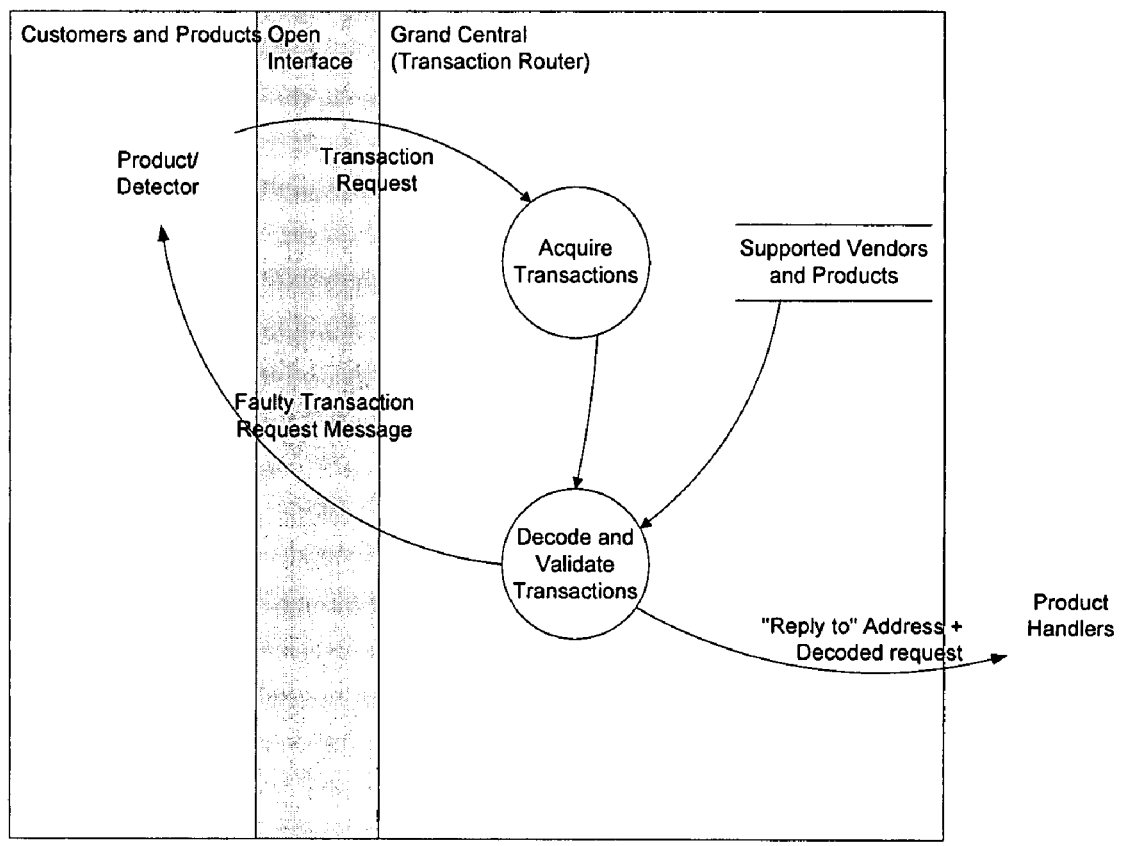
FIG. 5 illustrates certain data flows associated with the router of FIG. 2.

Certain data flows associated with the router are shown in FIG. 5.

Product Handler

The primary function of the illustrative product handler 16 is to process requests received from the application 28c, via the Internet and router 14, and return the requested information/action to the originating device 12. In the illustrated embodiment, the information requested is the URL associated with the watermark payload sent by the application. In other embodiments, other actions and/or information may be requested.

Each received watermark payload is validated using information in the database 17. If the watermark payload ID is found and is active, the requested action is performed. If the watermark payload ID is not found or is in an inactive state, an error message is returned to the requesting application.

All requests are logged in a transaction log for tracking and billing purposes. This includes any secondary payload information (zip code, Demographic Household ID, etc.) passed in by the application 28c. The log can be maintained by the product handler 16, or elsewhere.

To speed system response, the product handler 16 may anticipatorily send URLs to the application corresponding to watermark payloads the handler foresees may be coming. These URLs can be cached in memory associated with the application 28c, and quickly recalled if needed by the application.

Consider, for example, a magazine containing watermarked advertising. If the user presents a first ad to the device 12, the watermark is decoded and forwarded to the product handler 16, which responds with a URL corresponding to that ad. The application 28c then passes that received URL to a web browser 28b on the device 12, which initiates a link to that internet address. But the handler now knows the magazine the user is reading. By reference to the watermark first received, the handler may discern, for example, that the user is reading the San Francisco edition of the Mar. 14, 2000, Time magazine, and just looked at page 85. Based on this information the handler can query the database 17 for URLs associated with other advertising in that issue. (The database index is structured to permit fast queries identifying all ads in a given magazine issue or other collective data source.) These URLs are passed back to the application 28c and cached. If the user next presents an advertisement from page 110 to device 12, the application 28c finds it already has the corresponding URL locally cached. The application then passes the corresponding URL to the web browser. The web browser initiates the link immediately, obviating a data round trip between the application and the remote system.

The caching can be optimized in a variety of ways. One is to first send URLs corresponding to pages that are next-expected to be encountered. For example, if the user just presented page 85 to the sensor 22, after sending the URL for that page, the handler 16 would next send the URLs associated with pages 86, 87, etc. On sending the URL for the last page of the magazine (typically the rear cover), the handler could start from the beginning (typically the front cover) and send further URLs up to that for page 84. Another optimization is to first cache URLs for the most conspicuous ads, e.g., first send URLs for any 2-page spread ads, then for each full page add, then for each successively smaller fractional-page ad. Still another approach is for handler 16 to dispatch URLs to device 12 for caching in accordance with a contractually-agreed priority. One advertiser, for example, may pay a premium ad rate in exchanged for being cached before other advertisers who don't pay the premium. Other caching priorities, and combinations of such priorities, can naturally be employed.

In some systems, the advertisers or publishers may be charged for use of the system based on the number of URLs served by the system for linking. If local caching of URLs (e.g., at device 12) is employed, it is desirable for device 12 to report to router 14 (or handler 16) the URLs that are actually retrieved from the local cache and used for linking, so that the remote system can log same. Thus, each time the user presents an object to sensor 22 for which a corresponding URL is already cached, application 28c dispatches a message to router 14 reporting the event (and, usually, the particular URL involved). This event is then logged in the transaction log.

This anticipatory dispatching of URLs is one alternative function that may be performed by a product handler. Another is if the application 28c queries the product handler to determine if a more recent version of the application is available for download. If so, the application—through interaction with the user—can request that the product handler respond with a software download.

In greater detail, application 28c can periodically query the product handler as to the identity of the latest version of application 28c (e.g., the first time the application is used each day). Device 12 may have version 3.04, and the remote system may respond that version 3.07 is the most current. In such case the application 28c can alert the user—by suitable text, graphics, or other means—that a more recent version of the program is available, and query whether such updated version should be obtained. If the user so instructs, handler 16 can serve to device 12 the latest version of the application (or a patch permitting the presently-installed version to be updated).

Sometimes it may not be necessary to update the application version. Instead, data from the remote system may indicate the desirability, or necessity, or changing just one or more parameters in the application 28c. For example, new security keys can be dispatched periodically by handler 16 to device 12, and used to change the security configuration of the application. Or the application 28c can be instructed to direct further outgoing watermark traffic—either for the next hour, day, or until instructed otherwise—to a different router 14. Such instruction can be used to optimize system performance, e.g., for router load balancing purposes, to avoid internet routes that are found to be slow, etc.

In summary, the detailed handler:

1. validates the received identifier (e.g., watermark serial number) against the list of active identifiers; and, if the serial number is not found, return an error message to the calling session, and log the error to an error handling routine;

2. for each received, valid watermark serial number, finds the corresponding active primary action from the database;

3. for each received, valid watermark serial number, if the handler finds the corresponding primary action is currently not active, it performs an alternative, "default" action instead;

4. if the handler finds an active primary action associated with the received valid watermark serial number, it returns the URL for application use in redirection (round trip approach), or serves the HTML page found to the calling session;

5. if the handler does not find an active primary action associated with the received valid watermark serial number, but does find an associated default action, it returns that URL for application use in redirection (round trip approach), or serves the HTML page found to the calling session;

6. if the handler does not find a valid, active primary or default action associated with the watermark serial number, it returns an error message to the calling session, and logs the error to the error handling routine;

7. records each transaction, including those that result in error messages, for billing and analysis purposes (in other embodiments, this function may be performed by the router, instead);

8. responds to a "software version request" by returning the most recent available application software version number to the calling session;

9. responds to a "software download request" by initiating a file transfer of the most recent available application software to the calling session;

10. responds to a valid Request for Registration packet upload (proper format, an existing serial number, an account ID and a valid corresponding account password) by returning a current registration packet for the provided watermark serial number;

11. responds to an invalid Request for Registration packet by returning an error message to the calling session noting the failure;

12. responds to a local transaction cache flush request by writing the locally cached transactions to the transaction log; and 13. responds to a multiple URL request by returning the URL associated with the provided serial number first, followed by all other active serial numbers and URLs for the publication, issue and region code (optional) provided.

Certain of the above-described processes associated with the product handler are shown in FIG. 6.

URL Performance Monitoring

Returning to operation of the system, the URLs identified in database 17 may, from time to time, become inoperative or impaired due to equipment problems at the remote web site or otherwise. If desired, the handler 16 (or another component of the system) can be programmed to periodically test each of the links registered as active in the database (e.g., once per day), and measure the time for the associated web page to load. If the web page doesn't load, or takes much longer to load than usual (and re-tests confirm that the condition isn't an anomaly), those conditions can be flagged in the corresponding database record. If the handler is requested to provide such a URL to a device 12, the handler can send a message—either with or without the URL—indicating to the device that the URL is misbehaving.

If the URL is working, but is unduly slow to load (either compared to its historical performance, or compared to other URLs), handler 16 can provide an interim diversion to the device 12. For example, it can instruct the device to launch a second browser window, and direct that browser to an alternate destination to entertain the user while waiting for the intended page to load. When the intended page is finally loaded, the first browser window can be displayed—either by closing the second, diversionary window, or by bringing the first window to the front while keeping the second window alive in the background.

This alternate destination is desirably a low bandwidth page, so that it will not unacceptably further slow loading of the desired URL. This alternate page can be one selected by the handler, for which the URL is sent after the desired URL. Or instead of providing a URL from the handler, the handler can serve an HTML or other page directly to the device 12. Or the alternative URL can be stored at device 12 and used to invoke the second browser window upon receipt of data from handler 16 indicating that the desired content will be slow in coming. In some embodiments the user can identify several alternate URLs (e.g., weather, stock info, jokes) and the handler or the application 28c may select among them randomly or otherwise. Or an HTML page or other application can be loaded locally at the device 12 in response to a "get ready to wait" indication from the handler 16.

If a URL is marked in the database 17 as slow or inoperative, the scanning operation periodically rechecks the URL to see if its status in the database should be changed (e.g., changed from inactive to active). Inactive URLs are reported to the registrant by email, and flagged for manual follow-up if not restored to action within a predetermined period.

Illustrative Responses by Product Handler

The reader is referred to application Ser. No. 09/343,104 for a sampling of the great variety of diverse applications enabled by the illustrated system 10. A few more are detailed below.

Consider use of the system 10 to enable personalized greeting cards. A greeting card company may prepare watermarked press-on stickers for use with its cards or other correspondence. The customer shows the sticker to a camera-equipped computer (either at the retail store, at home, or elsewhere). The computer decodes the watermark and sends same to a corresponding product handler 16 through the router 14. The handler—recognizing the watermark as an unregistered greeting card sticker—invites the customer to enter a destination URL, such as the customer's personal web page. This information is entered by the consumer and forwarded to the remote system for entry in the registration database 17. Thereafter, whenever the sticker is shown to a suitably-enabled system (e.g., by the card recipient), a browser window is automatically launched and directed to the web page specified by the purchasing consumer. (The same result can, of course, be effected without use of stickers, e.g., by encoding the greeting cards themselves.)

In some applications, the product handler may have a library of different responses it can provide to a user in a particular context, depending on the user's further selection. Consider a university student having a suitably-watermarked university ID card. When the card is presented to a device 12, the product handler replies with HTML instructions causing an options menu to appear on the device screen, e.g:

1. Review calendar of upcoming university academic events

2. Review calendar of upcoming university sporting events

3. Review present class schedule

4. Select courses for next semester

5. Review grades

When the student makes a selection (e.g., with a mouse, or by moving the ID card in a specified manner), the application 28c dispatches data corresponding to the selected option to the product handler, which then responds with the requested data.

In some cases (e.g., Review present class schedule, Select courses for next semester, Review grades), care must be taken to protect such information from persons attempting access using lost or stolen IDs. Accordingly, when any of these options is selected, the handler 16 may first respond to device 12 by querying for a password or PIN. Only after entry of the correct password/PIN is the requested action performed. (For security reasons, the university may prefer that the password authentication process be performed by a dedicated on-campus server, rather than by product handler 16. Naturally, this and other tasks can be delegated to processors other than handler 16 as best fits the situation.)

In other cases, an option menu needn't be presented—the correct response is inferred from the context or environment. Consider a drivers' license that is watermarked with identification of the owner. If presented to an email kiosk 12 at an airport, the decoded watermark may be used to look-up an email account corresponding to that individual, and download new mail. If the same drivers license is presented to a check-in kiosk, the decoded watermark may be used to look up that person's flight reservation and issue a seat assignment. In both cases the kiosks can be essentially identical. One, however, identifies itself to the router/product handler as an email kiosk, the other as a check-in kiosk. The response undertaken by the router/product handler differs accordingly.

Returning to the university example, there may be cases in which students are tempted to swap photos on a student ID, e.g., to permit an imposter to take a graduate school qualifying exam on behalf of a less-qualified student. In the usual case, such photo-swapping may be difficult to detect. This problem can be combated by an exam check-in procedure that includes having each student present their ID to a device 12. An application 28c specialized for this task can forward a watermark decoded from the ID photograph to a handler 16, which responds by causing an image of the identified student to be displayed on device 12. (The university could compile the requisite database of student images as it issues ID cards.) If the exam proctor sees an image on the device that does not match the image on the ID card, appropriate action may be taken. (This arrangement is applicable wherever photo ID documents are used, including airport check-in, customs, immigration, etc.)

Still another application of the illustrated system is to look-up, or act on, meta-data associated with a marked object. Consider an image, video, or audio file that a user downloads from the internet. Familiar applications such as Microsoft's Windows Explorer (including Internet Explorer) may be configured with watermark decoders activated, e.g., from a Properties panel (accessed, e.g., by right-clicking on the file icon or name and selecting the "Properties" option). When a watermark is detected in a file, the Explorer application can send a corresponding packet to a remote system (e.g., the depicted router/product handler/database). The remote system recognizes the packet as originating through the Properties panel of Windows Explorer, and looks-up the watermark ID in a database 17. Meta-data corresponding to the file (e.g., proprietor, creation date, licensing terms, exposure data, subject, etc.) is returned from database 17 (or from another database identified by the router, handler, or database) to the application 28c, and is displayed in the Properties panel (optionally under an appropriate "tab").

(The present assignee has long offered a "MarcCentre" service that serves as a clearinghouse through which watermark identifiers found in photographs, etc., can be used to identify the proprietors and associated information corresponding to such objects.) In embodiments of the present utilizing this service, the router 14 passes the request to Marc-Centre server (a product handler in this instance), which provides the solicited information back to the originating application. The present assignee's MarcSpider service complements the service provided by the Media Commerce product. The MarcSpider service constantly scans Internet sites evaluating each graphic encountered to determine whether it contains a watermark. (Audio and video can be similarly analyzed.) With each detected watermark, the MarcSpider service records the graphic file name, size, format, date/time and URL where the graphic was found. This information is then made available to MarcSpider customers in report form.)

Instead of simply displaying the meta-data, the application and/or the remote system can make use of it. For example, if the meta-data indicates that the proprietor of a watermarked image is Corbis, and that the image can be licensed for a certain use under certain terms, the remote system can be utilized as a licensing server—receiving payment information from the user, granting the license, and forwarding transaction details to Corbis.

Still another application is the sale or promotion of music or video over the internet. Taking the case of music, an artist may freely distribute a low-fidelity (or otherwise corrupted or abridged) version of a song. The low fidelity can be by reason of bandwidth limitation (e.g., 500 Hz-2.5 KHz), monophonic (as opposed to stereo), or otherwise. The artist can seek to distribute the low-fidelity version as widely as possible, to serve as a marketing agent for the artist's other works. (The free distribution of lower-bandwidth audio may serve to alleviate some of the network bandwidth problems faced by universities whose students actively engage in transferring free music over the internet.)

Each low-fidelity version can be processed to extract an identifier (e.g., a steganographic in-band watermark; a numeric ID or song/artist name field in a in a file header; a 128-bit hash value obtained by applying a hashing algorithm to the music data, the music file header data, a portion thereof, etc.) If a listener is interested in obtaining a full-fidelity version of the work, the listener can operate a suitably programmed computer or music appliance that extracts the identifier from the work and passes it on to the remote system. The remote system can respond in various ways, e.g., by providing a full-fidelity version of the same work back to the user (such as MP3 download) and charge the user's credit card a fee (e.g., $0.99); or by directing a web browser on the user's computer to an e-commerce/fan web site associated with the music, etc. Such functionality can be provided in general purpose programs such as Microsoft's Internet Explorer, e.g., by right-clicking on a file to obtain a menu that includes this and related functions.

Figure 8:
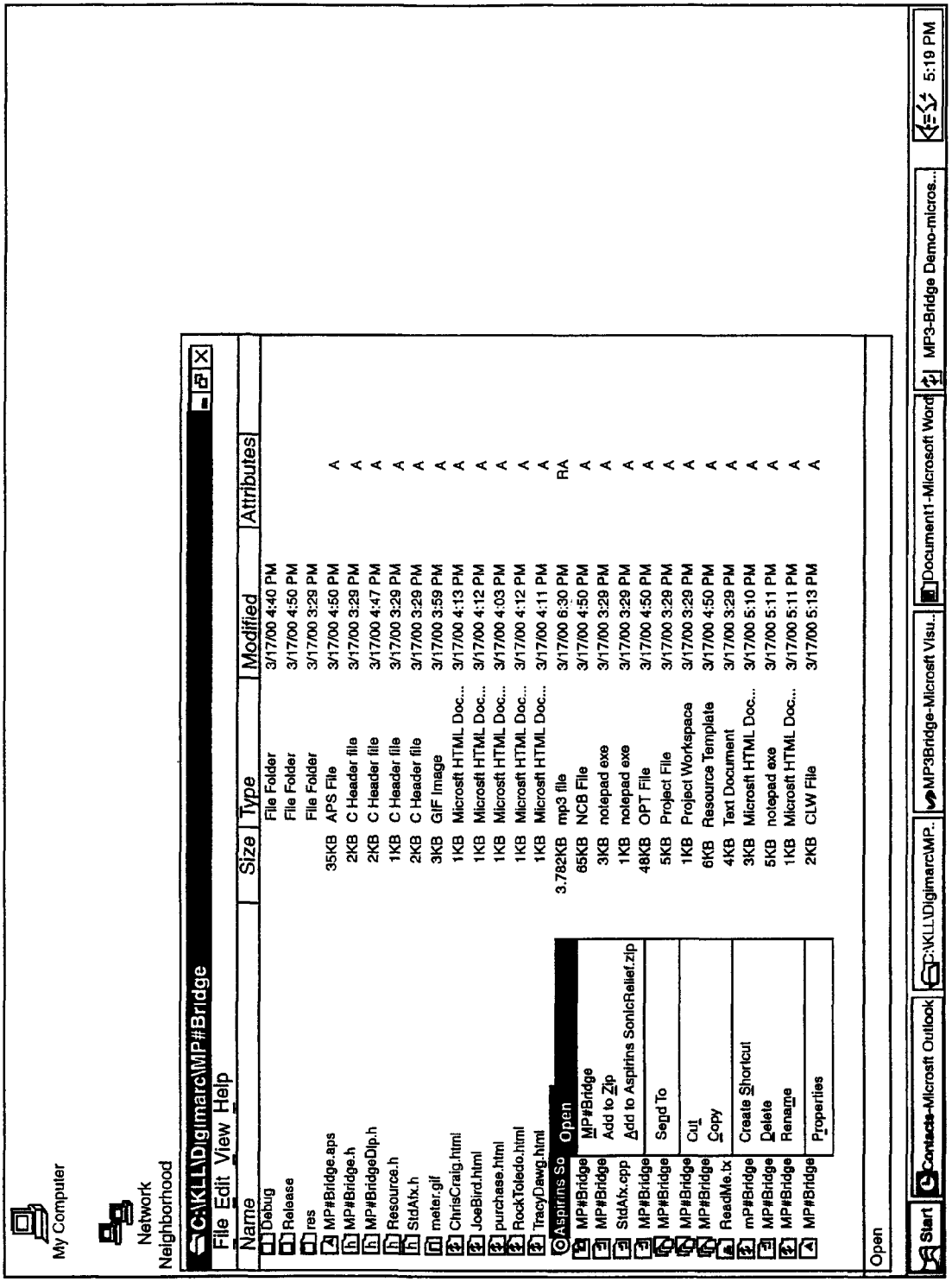
FIGS. 8-10 show a sequence of screen shots from one application of the present technology.
Figure 9:
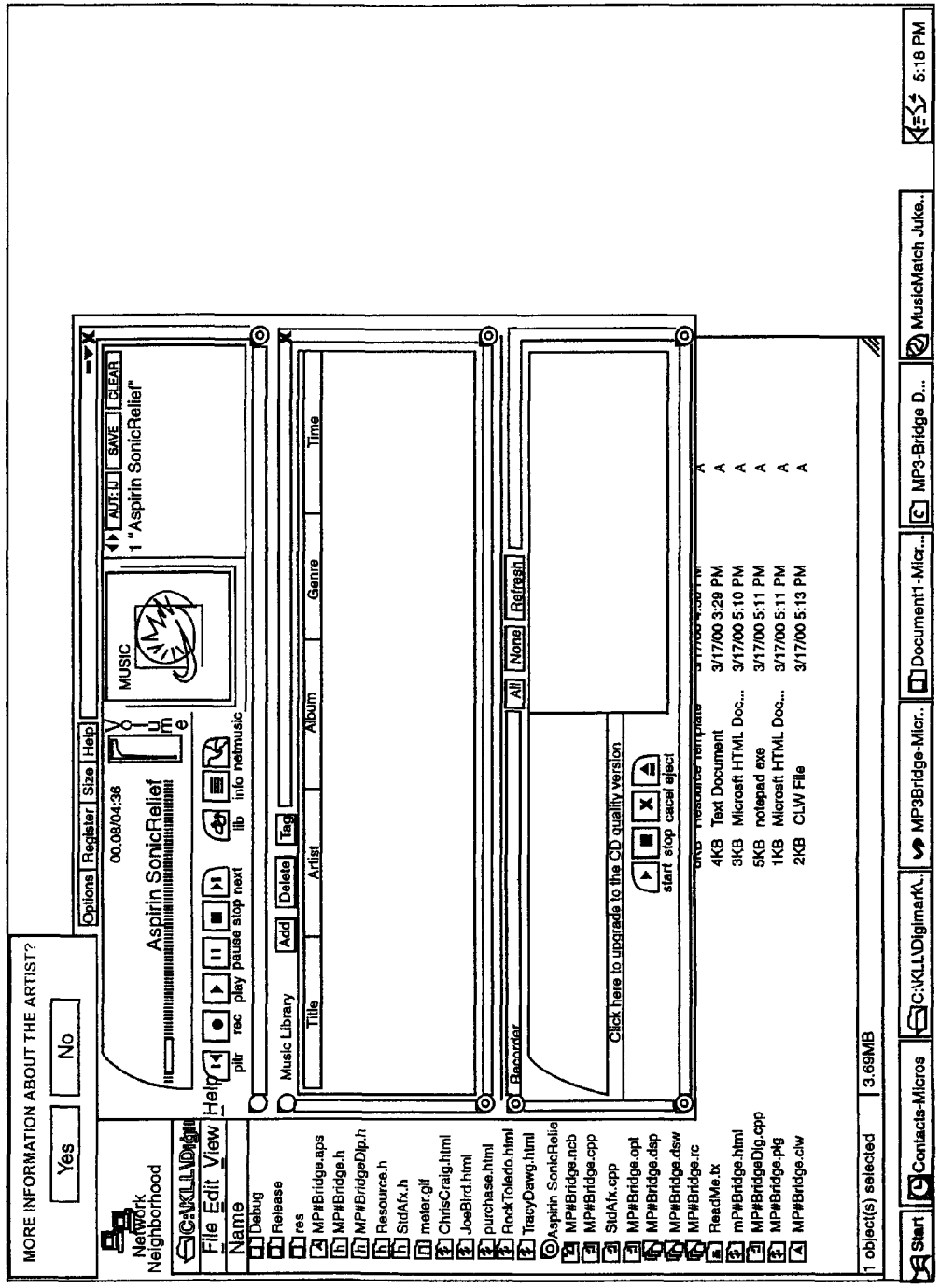
Figure 10:
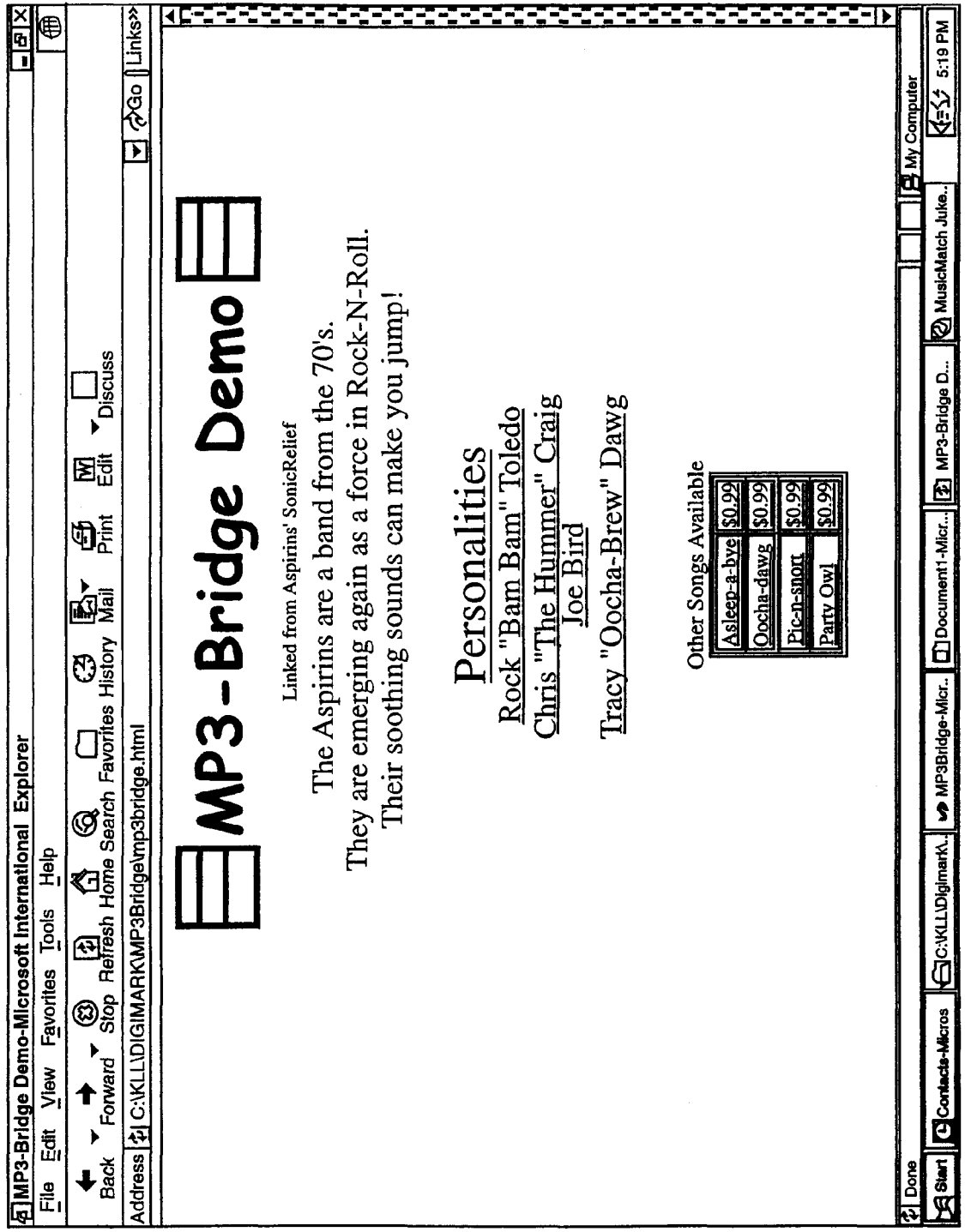

FIGS. 8-10 show a sequence of screen shots from such an embodiment. In FIG. 8, a user has right-clicked on an MP3 file icon in a directory listing 200. A property menu 202 pops up that includes, as its second option "MP3Bridge."

FIG. 9 shows what happens when the user selects the MP3Bridge option. An MP3 player 204 is launched, and a dialog box 206 appears. The dialog box queries the user, "More Information About the Artist? Yes No."

FIG. 10 shows what happens if the user selects "Yes." The software sends the identifier—extracted from the MP3 file—to the remote system. The remote system responds with the address of an associated web page, and instructs the user's computer to launch a new browser window directed to that page.

The same functionality can naturally be invoked through the user interface of the MP3 player (or a Windows Media-Player, etc., rather than through Internet Explorer). The music application can spawn a separate window, or present the options and the associated data within the existing window.

Yet another application of the remote system is as a "net nanny" filter. Links requested through the system can be checked for keywords, adult-content flags, content ratings, or other indicia of age-suitability, and provided to the requesting computer 10 only if they meet certain earlier selected criteria.

Again, it will be appreciated that the foregoing examples are but a few of myriad applications enabled by the detailed system.

Reporting

System software may enable the provision of customer-accessible reports (accessible over the internet) that show detailed and summary usage information by date, customer, publication, issue date, region, product/version, etc. These reports can be both regularly scheduled and ad-hoc. The specification of the content, relationships and the timing of the reports can be defined by the customer on-line.

Illustrative reports detail:
a) Hit rates/Transactions per customer per ad
b) Hit rates/Transactions per customer per publication per ad
c) Hit rates/Transactions per customer per publication per issue per ad
d) Hit rates/Transactions per customer per publication per issue per region per ad
e) Hit rates/Transactions rates by originating application (28*c*)
f) Hit rates/Transactions by originating application vendor
g) Hit rates/Transactions rates by originating web domain (e.g., aol.com)
h) Hit rates/Transactions rates by postal/zip codes
i) Hit rates/Transactions by country Additional marketing/marketplace reporting can also be produced for internal analysis by the service provider, and for sale to other entities. These reports typically provide a more global view of the impact and usage of the system. Using information stored in a demographic database, in conjunction with these usage patterns, the system can provide customers and research agencies with more detailed demographic/statistical data on the system's usage and effectiveness.

In an illustrative system, certain statistics in the demographic database are compiled using statistics from a sample of users that consent to have their activities tracked in some detail, in consideration for certain perks (e.g., give-away cameras, bar-code scanning pens, or other devices, etc.). These users are termed Demographic Households. A software program included in the systems solicits information detailed in the following table from such users over the internet, with a web-enabled interface. A related program allows such users to update/edit their user/household information previously entered. Each such session is password authenticated for security.

| User Information | Comments |
|---|---|
| Name | |
| Address | |
| Street | |
| City | |
| State | |
| Country | |
| Postal Code | |
| Phone number | |
| E-mail address | |
| Household Annual Income | Provided as raw $ or as a selection from a range of numbers |
| Occupation | |
| Education | May be per member of household. |
| Profession | If applicable |
| Number of members of household | |
| Member of household | |
| Age | |
| Sex | |
| Internet user? | |
| User of this linking service? | |
| Internet usage per week | In hours. Sum of entire household |
| Internet business usage per week | |
| Primary Internet usage? | Typical household use of the Internet. May be a selection list |
| Owned a computer since? | Year only |
| Number of computers in the home? | |
| Types of computers in the home? | Mac, PC, etc. Select all that apply |
| Rooms where the computers are located | Home office, bedroom, etc. Select all that apply |
| What ISP do you use? | |
| What is your modem speed? | Select from list that includes ISDN, ADSL, cable + dial up modems. |
| Are you willing to be an official "Demographic Household" and allow | |

-continued

| User Information | Comments |
| --- | --- |
| us to contact you for feedback on our products and advice on new products? What other technology devices do you have in your household? | Scanners, PC cameras, digital cameras, DVD, PDAs, etc. Select all that apply |

Audio and Video

As with paper advertisements, the illustrated system provides users of web-connected PCs or other appliances with methods of obtaining information, content, associated products, or associated services using the same principles as detailed above.

For example, an application 28 can "capture" music or other audio using a recording device (note recorder, microphone connected to PC, MP3 player, etc.) and analyze the captured audio to detect an embedded watermark. Once detected, the application passes some or all of the watermark payload information, together with identification of the application and its vendor, to the router. The router forwards the payload information to a handler corresponding to the application. The response of the product handler varies with the context and nature of the data. For example, the handler may return the artist, title, track, album, web URL and purchasing information, to the user. Recorded news and entertainment segments may include transcripts (audio, video and/or text) of the segment along with other related web site information. The handler may simply cause the device 12 to launch a browser window directed to a music commerce web site where the music can be purchased.

Audio and video applications of the present technology are more particularly detailed in the related applications cited above.

Monitoring

Automated performance monitoring occurs at several levels within the detailed system, including:
   a. Network monitoring (traffic+device availability)
   b. Computer system monitoring (disk space, memory utilization, CPU usage, etc.)
   c. Process monitoring (scheduled job starts, stops, run times (duration), and errors)

For each monitored point, two thresholds are typically established—warning thresholds and failure thresholds.

When a system exceeds a warning threshold value, it indicates that a situation is now present that may affect the system's performance in the near future. These warnings are used by the operations staff to help head off potentially serious problems. While the warning indicators are available at all times for operations staff viewing, they do not require immediate attention.

When a system exceeds a failure threshold, it means that a condition that directly affects the system's ability to properly serve its customers has been detected. A monitoring system immediately notifies the appropriate personnel, via pager, of the condition. If the condition is not resolved or acknowledged within the pre-defined elapsed time, the monitoring system escalates the problem notification to the backup personnel and to company management.

All monitored activities are logged (successful completion, errors, warnings and failures) for ongoing system reliability analyses.

Backup and Recovery

While the illustrated architecture desirably employs redundant systems to increase the overall reliability and availability, rapid recovery from failures is required for peak system performance. Areas of possible system failure include
   a) Loss of computer
   b) Loss of network/network segment
   c) Loss of electrical power
   d) Loss of Internet connectivity
   e) Loss of physical site
   f) Corrupted software
   g) Loss of data/database
   h) Corrupted database The system has specific backup and recovery plans and procedures for each of these conditions:
   a. To address the loss of computers, the architecture is built with redundant capabilities.
   b. To address the loss of network/network segment, the computers are simultaneously connected to two separate network segments.
   c. To address the loss of electrical power, the physical facility is provided with plural electrical feeds from different power substations entering the facility from plural directions.
   d. To address the loss/corruption of software and data/databases, the critical software and data are housed on redundant computers and backups of these are regularly scheduled.
   e. To address the loss of Internet connectivity, the facility has plural separate Internet connections provided on two different telecommunications trunks routed into the building from different directions.
   f. Finally, to address the loss of physical site, the system is desirably mirrored at a remote location, with the capability to direct all traffic to the mirror site until operations at the primary site are restored.

Security

The system's basic security philosophy is to grant access to each customer's information only to the users authorized by the customer. To this end, the system desirably should:
   1. Create and maintain a list of authorized users (accounts).
   2. Employ security methods to deny access to any unauthorized users.
   3. Limit users to access only the objects they are authorized to access (typically, the objects belonging to that customer).
   4. Report and record all unauthorized access attempts.
   5. Maintain a log of all authorized user logins (sessions).
   6. Provide the capability for the watermark registrant to grant access rights to other accounts (such as ad agencies and pre-press houses).
   7. Establish initial passwords for each account
   8. Provide the capability for each authenticated user/account to change their password
   9. Provide the capability to reset an authenticated user/account's password in the event the current password is lost.
   10. Store all passwords as encrypted values (to prevent theft of passwords).
   11. Provide the capability to restrict the creation, modification, deletion, and listing/viewing of account information to authorized users.

Audit Trail

Because of the financial implications of the system's activities, all changes to any registration or customer data need to be recorded. This audit trail provides the operator and its customers with an accurate accounting for the current and previous states of the data.

The audit software desirably records the creation, modification, and deletion of all registration and customer data. The audit software also records the username, date/time of creation/modification/deletion of records, and—for modifications—the before and after images of the data changed.

Application-to-Product Handler Interface Definition

The basics of the interface between the application 28c and the handler 16 are (a) a flexible request and response package structure, and (b) a defined connection method based on industry standards. The illustrated messaging employs the http and/or the https protocol to send and receive messages among the system components. An overview is provided in FIG. 4.

Message Format

The message format is XML-compliant and is defined by the following XML DTD—

```
<!DOCTYPE list [
<!ELEMENT Content (vendor, appl, prod)>
<!ELEMENT vendor (#PCDATA)>
<!ELEMENT appl (#PCDATA)>
<!ELEMENT prod (#PCDATA)>
]>
```

The application 28c appends its data to this header for transmission to the product handler 16. Exemplary messages and product handler responses are detailed in the sections that follow.

Application Message Definitions

The application message definitions can be broken down into Request Code, Primary and Secondary information.

The Request Code instructs the product handler 16 to take a specified action.

The Primary information portion contains the data required to properly service the application's request. The Primary Information varies based on the Request Code.

The Secondary Information is intended for use by analysis and reporting tools and does not instruct nor aid the product handler in servicing the user's request. Secondary Information contents change based on the Request Code and not all Request Codes are required to have associated Secondary Information. In addition, most of the Secondary Information requires the consumer to grant express consent to its collection. If that consent is not given, the application does not send Secondary Information. A special case exists for selected, consenting consumers to become part of a demographic database.

Primary and Secondary information may change by request type, but in general conform to the definitions below. The generic format for the product handler is also defined below.

Primary Information includes the Application Version, Watermark Type, Watermark Serial Number, Context and Environment.

Application Version: used by the product handler to modify its actions, typically for backwards compatibility Watermark Type: top 9 bits of the illustrative watermark payload. Used by the product handler in processing the Watermark Serial Number Watermark Serial Number: remainder of the watermark payload. Provides the index used by the product handler to access the watermark in the registration database Context: instructs the product handler to modify/refine its action based on the consumer request's context Environment: instructs the product handler to modify/refine its action based on the consumer request's environment. (The environment may be specified, e.g., as home, office, car, portable appliance, etc.)

Other Request codes can, of course, be used. Each may have its own list of mandatory and optional Primary Information fields. Optional fields are excluded from the primary Information when there is no value associated.

Secondary Information:

Demographic Household ID: identifier for a selected demographic group. This is used as an index to the actual demographic Input device: Manufacturer, model and version of the device used to detect the watermark (e.g., a TWAIN driver string)

Operating System: operating system in use on the consumer PC

Processor: processor type/class on the consumer PC

Processor speed: processor clock speed, in MHz, of the consumer PC. (May be entered by user, or auto-detected.)

Language: preferred consumer spoken language

Country: Country where the consumer PC resides

Postal Code: Consumer's postal code (used along with the country to pinpoint the location of the consumer).

(In addition to these explicit data, the packet sent from the device 12 also conveys an IP address (inherent in the use of http protocols) so that the remote device (e.g., the router/handler) has an address to which it can respond.)

Response from Product Handler

| RtnCode | Success = 1 |
|---|---|
| URL | the active URL for the watermark serial number received |
| | or |
| RtnCode | Error <0 |
| Error Message | text. |

Request for URL
Required Inputs
   Header (XML Format)

| Vendor | (e.g., = Digimarc) |
|---|---|
| Appl | (e.g., = MB) |

Data
Required Information—

| Req = | RFU |
|---|---|
| Ver = | application version number |
| Type = | watermark type number |
| Ser = | watermark serial number |
| Cxt = | context |
| Env = | environment |

Optional Information—

| | |
|---|---|
| Ctry = | User's Country name |
| Lang = | User's preferred Language |
| HHID = | Demographic Household Identifier |
| Det = | TWAIN string of the sensing/detecting device |
| OS = | User PC Operating System string |
| Proc = | User PC processor type and class |
| Speed = | User processor speed |
| Zip = | User postal code |

Example:

```
<?xml version="1.0"?>
<Content>
<vendor>Digimarc</vendor>
<appl>MB</appl>
</Content>
Req=RFU
Type=1
Ser=10001
Ver=1.0
Cxt=A
Env=Q
Ctry=USA
Lang=English
HHID=1234567
Det=TWAIN string
OS=Win98
Proc=Pentium III
Speed=500
zip=74008-1234
```

Response from Product Handler

```
RtnCode=Success/Error number (Success = 1)
URL=URL associated with specified watermark type and Serial number
Exp=Expiration date/time (GMT) for caching purposes - format of
mm/dd/yyyy hh:mm:ss
   or
RtnCode=Success/Error number (Error <0)
MsgText=message text
```

Error Reasons:
1 Type and Serial Number OK, but no URL in database (both the primary and default URL are missing)
2 Type and Serial Number OK, but URL is marked as inactive (neither the primary nor the default is active)
3 No record in database matching the Type and Serial Number
4 Request format error—incomplete data Request for Configuration
  Required Inputs
  Header (XML Format)

| | |
|---|---|
| Vendor | (e.g., = Digimarc) |
| Appl | (e.g., = MB) |

Data
Required Information—

| | |
|---|---|
| Req = | RFC |
| OS = | User PC Operating System |

Example:

```
<?xml version="1.0"?>
<Content>
<vendor>Digimarc</vendor>
<appl>MB</appl>
</Content>
Req=RFC
OS=Win98
```

Response from Product Handler

```
RtnCode= Success/Error number (Success = 1)
Ver=Latest Application version# available for download
https=yes (or n )
GCURL=URL used to route subsequent Application requests
   or
RtnCode= Success/Error number (Error <0)
MsgText=message text
```

Error Reasons:
  5 Unknown Operating System
  4 Request format error—incomplete data
Request for Associated URLs
  Required Inputs
  Header (XML Format)

| | |
|---|---|
| Vendor = | Digimarc |
| Appl = | MB |

Data
Required Information—

| | |
|---|---|
| Req = | RFA |
| Ver = | application version number |
| Type = | watermark type number |
| Ser = | watermark serial number |
| Cxt = | context |
| Env = | environment |

Example:

```
<?xml version="1.0"?>
<Content>
<vendor>Digimarc</vendor>
<appl>MB</appl>
</Content>
Req=RFA
Type=1
Ser=10001
Ver=1.0
```

Response from Product Handler

```
RtnCode= Success/Error number (Success = 1)
Ser1=watermark serial number
Type1=watermark type number
URL1= URL associated with specified watermark type and Serial number
Exp1=Expiration date/time (GMT)
```

```
Ser2=watermark serial number
Type2=watermark type number
URL2= URL associated with specified watermark type and Serial
  number
Exp2=Expiration date/time (GMT)
..... .
Ser'n'=watermark serial number
Type'n'=watermark type number
URL'n'= URL associated with specified watermark type and Serial
  number
Exp'n'=Expiration date/time (GMT)
    or
RtnCode=Success/Error number (Error <0)
MsgText=message text
```

Error Reasons:
   8 Type and Serial Number OK, but no associated watermarks or URLs in database
   9 Type and Serial Number OK, but all associated URLs are marked as inactive
   3 No record in database matching the Type and Serial Number
   4 Request format error—incomplete data Request for Transaction Download
(Needed to account for locally cached redirections. One request per local redirection.)
Required Inputs
   Header (XML Format)

| Vendor = | Digimarc |
|---|---|
| Appl = | MB |

Data
Required Information—

| Req = | RFT |
|---|---|
| Ver = | application version number |
| Type = | watermark type number |
| Ser = | watermark serial number |
| Cxt = | context |
| Env = | environment |

Optional Information

| Ctry = | User's Country name |
|---|---|
| Lang = | User's preferred Language |
| HHID = | Demographic Household Identifier |
| Det = | TWAIN string of the sensor device |
| OS = | User PC Operating System string |
| Proc = | User PC processor type and class |
| Speed = | User processor speed |
| Zip = | User postal code |

Example:

```
<?xml version="1.0"?>
<Content>
<vendor>Digimarc</vendor>
<appl>MB</appl>
</Content>
Req=RFT
Type=1
Ser=10001
Ver=1.0
Cxt=A
Env=Q
Ctry=USA
Lang=English
HHID=1234567
Det=TWAIN string
OS=Win98
Proc=Pentium III
Speed=500
zip=74008-1234
```

Response from Product Handler

```
RtnCode=Success/Error number (Success = 1)
    Or
RtnCode=Success/Error number (Error <0)
MsgText=message text
```

Error Reasons:
   4 Request format error—incomplete data

To provide the fastest possible system response, it is desirable that data exchanges between the originating device 12 and the remote system be as short as possible—preferably of a size that can be transported in a single internet data packet (i.e., less than about 536 bits). Such an arrangement avoids the overhead associated with data division on transmission, and data reassembly on reception.

Generally speaking, the combined elapsed time of the system service (i.e., watermark recognition by application 28c, packet delivery to router, decoding by router, handling by product handler, and return of response to application) for a single request shall average no more than 3 seconds as measured from receipt of request to $1^{st}$ byte sent in response to request. Typical speeds are less than 2 seconds, with many responses being provided in less than 1 second.

Having described and illustrated the principles of our technology with reference to a preferred embodiment, it should be apparent that the technology can be modified in arrangement and detail without departing from such principles.

For example, while the detailed embodiment relies on watermark technology to identify the object 20, this is not essential. Any technology permitting machine identification of the object can be employed, including bar codes (1- or 2-D), data glyphs, and other machine-readable indicia, mag stripes, RF IDs, hash-codes based on object data, etc.

Similarly, while the detailed embodiment described the coupling between various system components as being effected by the internet, this need not be the case. Some of the linking can be effected by wireless data transmission. Other links can be conveyed through private data networks, telephone services, etc.

While the detailed router, product handler, and registration server are illustrated as comprising distinct computers, in other embodiments these functions can be consolidated in one or two computers (with functions illustrated as performed in two computers being consolidated into one, etc.), or can be distributed among more than three computers. The components can be co-located, or distributed geographically. In some embodiments some or all of the functions performed by these components can be provided by the user's computer itself.

Likewise, the common reference to a "computer" as the device 12 shouldn't obscure the fact that the device can take many other forms. A cell phone, for example, has a processor, screen display, microphone, and wireless link that makes it well-suited for use in connection with the above-described technology. (Consider its use, for example, as the audio listening device in the arrangement disclosed in application Ser. No. 09/476,460.) Personal digital assistants, such as Palm Pilots and the like can be used (and accessorized for use) as device 12. Etc., etc. Moreover, the "computer" as the device 12 operates using "non-transitory computer readable medium" such as an electronic, optical, or magnetic storage device.

While the detailed embodiment is a system of many parts, it will be recognized that novelty also resides in individual components thereof, and that such components can also be employed in other systems and devices.

To provide a comprehensive disclosure without unduly lengthening the specification, applicants incorporate by reference any patents and patent applications referenced above.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiment is illustrative only and should not be taken as limiting the scope of the technology. Rather, we claim all such modifications as may come within the scope and spirit of the following claims and equivalents thereof.

We claim:

1. A method employing a handheld device, the method comprising:
    processing, using a processor, data corresponding to music content, by an algorithmic process to produce content-identifying data useful in identifying the content, wherein the algorithmic process is different than an algorithm for extracting digital watermark data that may have been earlier steganographically encoded into the content;
    wirelessly sending, using a wireless interface, the content-identifying data from a device to a remote computer system, together with application identifier data, in one or more packets including XML compliant data;
    as a consequence, wirelessly receiving data at the device from the remote computer system;
    by reference to the received data, presenting information relating to the music content on a screen of the device, wherein the presented information comprises information identifying a title of the music content, and information identifying a performer of the music content; and
    presenting one or more selectable features to obtain at least one of: further information relating to the music, or different music.

2. The method of claim 1, further comprising:
    capturing audio with a microphone; and
    generating the corresponding data therefrom.

3. The method of claim 1, wherein the presented one or more features comprises one or more hyperlinked indicia presented on a display screen.

4. A method for registering content identifiers, the method comprising:
    receiving login information related to a first party;
    checking the login information, using a computer device configured by software instructions, to confirm that the first party is authorized;
    receiving first data naming an item of audio or video content;
    receiving second data comprising attributes associated with the audio or video content;
    receiving third data comprising information regarding content-specific action(s) to be associated with the content;
    storing the aforesaid data in a database record associated with the content, wherein the database record is stored on a computer readable storage medium.

5. The method of claim 4, wherein the action associated with the content comprises return of URL information.

6. The method of claim 4, wherein the action associated with the content comprises return of HTML information.

7. The method of claim 4, wherein the action associated with the content comprises display of ownership information for the object.

8. The method of claim 4, wherein the action associated with the content comprises display of rights information for the object.

9. The method of claim 4, wherein the action associated with the content comprises download of software.

10. The method of claim 4, wherein the action associated with the content comprises delivery of audio or video.

11. The method of claim 4, wherein the action associated with the content comprises presentation of advertisement data.

12. The method of claim 4, wherein the receiving acts span plural sessions, rather than being all completed in a single session.

13. A method comprising:
    receiving a set of data comprising plural portions, wherein a first portion comprises an identifier of a content item, wherein a second portion comprises an identifier of an application that caused the set of data to be transmitted, and wherein a third portion comprises a "reply to" identifier;
    dependent on both the first and second portions, identifying a destination for the data from among plural possible destinations, wherein the identifying act makes use of a computer configured by software; and
    sending the data to the identified destination, together with the "reply to" identifier.

14. The method of claim 13, wherein the received set of data further comprises a fourth portion comprising an indicator of a vendor, and wherein the identified destination is dependent on each of the first, second and fourth portions.

15. The method of claim 13, further comprising performing a validation operation on at least certain of the portions before sending the data to the identified destination.

16. A method for handling media content identifiers to take action corresponding thereto, the method comprising:
    receiving a set of data comprising plural portions, wherein a first portion comprises an identifier of a content item, wherein a second portion comprises an identifier of an application that caused the set data to be transmitted, and wherein a third portion comprises a "reply to" identifier;
    looking up, using a computer device configured by software instructions, the content item identifier in a database;
    if no action is associated with the content item identifier in the database, using the "reply to" data to send an error message; and
    if an action is associated with the content item identifier in the database, taking action in accordance therewith.

17. The method of claim 16, wherein the action comprises using the "reply to" data to send a URL.

18. The method of claim 16, wherein the action comprises using the "reply to" data to send HTML data.

19. The method of claim 16, further comprising determining if an action associated with the content item identifier in the database is active and, if not, taking action in accordance with alternative action data obtained from the database.

20. The method of claim 4, wherein the second data, comprising attributes associated with the audio or video content, comprises identification information corresponding to the audio or video content.

21. The method of claim 1, wherein the presenting comprises presenting one or more selectable features to obtain further information relating to the music.

22. The method of claim 1, wherein the presenting comprises presenting one or more selectable features to obtain different music.

23. The method of claim 1, wherein the processing comprises hashing the data corresponding to music content.

24. The method of claim 1, wherein the processing data corresponding to music content comprises processing data samples that represent the content.

25. The method of claim 1, further comprising wirelessly sending the content-identifying data to the remote computer system, together with application identifier data, in a single packet.

26. A method employing a handheld device, the method comprising:
processing data, using a processor, corresponding to plural frames of video content, by an algorithmic process to produce content-identifying data useful in identifying the content, wherein the algorithmic process is different than an algorithm for extracting digital watermark data that may have been earlier steganographically encoded into the content;
wirelessly sending, using a wireless interface, the content-identifying data from a device to a remote computer system, together with application identifier data, in one or more packets including XML compliant data;
as a consequence, wirelessly receiving data at the device from the remote computer system;
by reference to the received data, presenting information relating to the video content on a screen of the device, wherein the presented information comprises information identifying a title of the video content, and information identifying a performer of the video content; and
presenting one or more selectable features to obtain at least one of further information relating to the video, or different video.

27. A non-transitory computer-readable medium having instructions stored thereon that, when executed by a computing device, cause the computing device to perform operations comprising:
processing data corresponding to music content by an algorithmic process to produce content-identifying data useful in identifying the content, wherein the algorithmic process is different than an algorithm for extracting digital watermark data previously steganographically encoded into the content;
sending wirelessly the content-identifying data from the computing device, together with application identifier data, in one or more packets including XML compliant data; as a consequence, wirelessly receive data at the computing device;
by reference to the received data, presenting information relating to the music on a display screen, wherein the presented information comprises information identifying a title of the music content, and information identifying a performer of the music content; and
presenting one or more selectable features to obtain at least one of: further information relating to the music, or different music.

28. The non-transitory computer-readable medium of claim 27, wherein the instructions are operative to present one or more selectable features to obtain further information relating to the music.

29. The non-transitory computer-readable medium of claim 27, wherein the instructions are operative to present one or more selectable features to obtain different music.

30. The non-transitory computer-readable medium of claim 27, wherein the algorithmic process comprises hashing the data corresponding to music content.

31. A non-transitory computer-readable medium having instructions stored thereon that, when executed by a computing device, cause the computing device to perform operations comprising:
processing data corresponding to plural frames of video content by an algorithmic process to produce content-identifying data useful in identifying the content, wherein the algorithmic process is different than an algorithm for extracting digital watermark data previously steganographically encoded into the content;
wirelessly sending the content-identifying data from the computing device, together with application identifier data, in one or more packets including XML compliant data;
as a consequence, wirelessly receiving data at the computing device;
by reference to the received data, presenting information relating to the video content on a display screen, wherein the presented information comprises information identifying a title of the video content, and information identifying a performer of the video content; and
presenting one or more features selectable by the user to obtain at least one of further information relating to the video, or different video.

32. A non-transitory computer-readable medium having instructions stored thereon that, when executed by a computing device, cause the computing device to perform operations comprising:
receiving a set of data comprising plural portions, wherein a first portion comprises an identifier of a content item, wherein a second portion comprises an identifier of an application that caused the set of data to be transmitted, and wherein a third portion comprises a "reply to" identifier;
dependent on both the first and second portions, identifying a destination for the data from among plural possible destinations, wherein the identifying act makes use of a computer configured by software; and
sending the data to the identified destination, together with the "reply to" identifier.

33. An apparatus comprising:
a processor configured to process data corresponding to music or video content, by an algorithmic process to produce content-identifying data useful in identifying the content, wherein the algorithmic process is different than an algorithm for extracting digital watermark data that may have been earlier steganographically encoded into the content; and a communication interface configured to:
  wirelessly send the content-identifying data together with application identifier data, in one or more packets including XML compliant data to a remote computer system;
  receive data in response to the sent data from the remote computer system; and
a display configured to:
  by reference to the received data, present information relating to the music or video content, wherein the presented information comprises information identifying a title of the music or video content, and information identifying a performer of the music or video content; and
  present one or more selectable features to obtain at least one of: further information relating to the music or video, or different music or video.

34. An apparatus comprising:
a communication interface configured to:
  receive login information related to a first party;
  receive first data naming an item of audio or video content;
  receive second data comprising attributes associated with the audio or video content;
  receive third data comprising information regarding content-specific action(s) to be associated with the content; and
a processor configured to:
  check the login information to confirm that the first party is authorized; and
  store the aforesaid data in a database record associated with the content.

35. An apparatus comprising:
a communication interface configured to receive a set of data comprising plural portions, wherein a first portion comprises an identifier of a content item, wherein a second portion comprises an identifier of an application that caused the set of data to be transmitted, and wherein a third portion comprises a "reply to" identifier;
a processor configured to, dependent on both the first and second portions, identify a destination for the data from among plural possible destinations; and
the communication interface further configured to send the data to the identified destination, together with the "reply to" identifier.

36. An apparatus comprising:
a communication interface configured to receive a set of data comprising plural portions, wherein a first portion comprises an identifier of a content item, wherein a second portion comprises an identifier of an application that caused the set data to be transmitted, and wherein a third portion comprises a "reply to" identifier;
a processor configured to:
  look up the content item identifier in a database; and
  if an action is associated with the content item identifier in the database, take the action associated with the content item identifier in the database; and
the communication interface further configured to:
send an error message using the "reply to" data, if no action is associated with the content item identifier in the database.

* * * * *

UNITED STATES PATENT AND TRADEMARK OFFICE
CERTIFICATE OF CORRECTION

PATENT NO. : 8,312,168 B2
APPLICATION NO. : 11/867480
DATED : November 13, 2012
INVENTOR(S) : Rhoads et al.

Page 1 of 1

It is certified that error appears in the above-identified patent and that said Letters Patent is hereby corrected as shown below:

On the Title Page, Item (75), under "Inventors", in Column 1, Line 1,
delete "West Linn (AE);" and insert -- West Linn, OR (US); --, therefor.

In the Claims:

In Column 31, Line 48, in Claim 26, delete "one of" and insert -- one of: --, therefor.

In Column 32, Line 40, in Claim 31, delete "one of" and insert -- one of: --, therefor.

Signed and Sealed this
Fourth Day of June, 2013

Teresa Stanek Rea
*Acting Director of the United States Patent and Trademark Office*